US012234425B2

(12) United States Patent
Shimizu

(10) Patent No.: US 12,234,425 B2
(45) Date of Patent: Feb. 25, 2025

(54) LUBRICANT, ELECTRIC CONTACT, CONNECTOR TERMINAL, AND WIRE HARNESS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Atushi Shimizu, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 646 days.

(21) Appl. No.: 17/440,074

(22) PCT Filed: Jan. 22, 2020

(86) PCT No.: PCT/JP2020/002021
§ 371 (c)(1),
(2) Date: Sep. 16, 2021

(87) PCT Pub. No.: WO2020/202717
PCT Pub. Date: Oct. 8, 2020

(65) Prior Publication Data

US 2022/0213404 A1 Jul. 7, 2022

(30) Foreign Application Priority Data

Mar. 29, 2019 (JP) ................................ 2019-065499

(51) Int. Cl.
*C10M 169/04* (2006.01)
*C10M 101/02* (2006.01)
(Continued)

(52) U.S. Cl.
CPC ...... *C10M 169/041* (2013.01); *C10M 101/02* (2013.01); *C10M 147/00* (2013.01);
(Continued)

(58) Field of Classification Search
CPC ........... C10M 169/041; C10M 101/02; C10M 147/00; C10M 2203/1025; C10M 2213/00;
(Continued)

(56) References Cited

U.S. PATENT DOCUMENTS 2,680,719 A * 6/1954 Young .................. C10M 169/02
508/553
4,169,916 A * 10/1979 Tsutsui .................... C23C 22/60
427/397.8

(Continued)

FOREIGN PATENT DOCUMENTS

CN 102618362 A 8/2012
EP 1672095 B1 9/2015
(Continued)

OTHER PUBLICATIONS

International Search Report issued on Apr. 7, 2020 for WO 2020/202717 A1.

(Continued)

*Primary Examiner* — Cephia D Toomer
(74) *Attorney, Agent, or Firm* — Venjuris, P.C.

(57) ABSTRACT

Provided are a lubricant capable of dispersing particles containing a fluororesin on the surface of a subject and of making the particles adhere to the subject surface without requiring use of a fluorine oil as a base oil; an electric contact
(Continued)

having the lubricant on the surface thereof; and a connector terminal and a wire harness having the electric contact. The lubricant contains a base oil and resin particles containing a trifluoroethylene resin, and the content of the resin particles in the lubricant is 10% by mass or more in relation to the mass of the base oil. An electric contact includes a substrate composed of a metal material electrically contacting another conductive member; and a layer of the lubricant arranged on the surface of the substrate. In addition, the connector terminal includes the electric contact at a location of electric contact with a counterpart connector terminal.

17 Claims, 12 Drawing Sheets

(51) Int. Cl.

| | |
|---|---|
| ***C10M 147/00*** | (2006.01) |
| ***H01R 13/03*** | (2006.01) |
| *C10N 40/14* | (2006.01) |
| *C10N 50/02* | (2006.01) |

(52) U.S. Cl.
CPC ..... *H01R 13/03* (2013.01); *C10M 2203/1025* (2013.01); *C10M 2213/00* (2013.01); *C10N 2040/17* (2020.05); *C10N 2050/02* (2013.01)

(58) Field of Classification Search
CPC ...... C10M 2201/02; C10M 2203/0206; C10M 2203/1006; C10M 171/06; C10M 2213/02; C10M 147/02; H01R 13/03; C10N 2040/17; C10N 2050/02; C10N 2020/017; C10N 2030/06
See application file for complete search history.

(56) References Cited

U.S. PATENT DOCUMENTS

| | | | |
|---|---|---|---|
| 6,010,984 | A | 1/2000 | Heimann et al. |
| 9,238,784 | B2 | 1/2016 | Sato et al. |
| 2006/0052258 | A1 | 3/2006 | Schutz et al. |
| 2006/0134403 | A1 | 6/2006 | Ohwaki et al. |
| 2009/0270292 | A1 | 10/2009 | Nonaka et al. |
| 2011/0218128 | A1 | 9/2011 | Hishinuma et al. |

FOREIGN PATENT DOCUMENTS

| | | | |
|---|---|---|---|
| JP | S50-030645 | A | 10/1975 |
| JP | S59-142291 | A | 8/1984 |
| JP | S59-142292 | A | 8/1984 |
| JP | S59-142293 | A | 8/1984 |
| JP | H08-002285 | A | 1/1996 |
| JP | H08-022858 | A | 1/1996 |
| JP | H08-143735 | A | 6/1996 |
| JP | 2003-073686 | A | 3/2003 |
| JP | 2005-019103 | A | 1/2005 |
| JP | 2005-232433 | A | 9/2005 |
| JP | 2007-326996 | A | 12/2007 |
| JP | 4083084 | B2 * | 4/2008 |
| JP | 2009-062464 | A | 3/2009 |

OTHER PUBLICATIONS

Mikhnevich, N. N.; Zolotovitskii, Ya. M.; Smurugov, V. A., Study of the formation mechanism and properties of the boundary layers of polymer-containing lubricants (7 pages).

* cited by examiner

| | | | |
|---|---|---|---|
| ELEMENT RATIO (F/Ag) | 0.13 | 0.23 | 0.37 |
| FRICTION COEFFICIENT | 0.99 | 0.39 | 0.21 |
| SLIDING MARK (× 200) |  |  |  |
| MAGNIFIED IMAGE OF SLIDING DISTANCE CENTER (× 2,000) |  |  |  |

LUBRICANT, ELECTRIC CONTACT, CONNECTOR TERMINAL, AND WIRE HARNESS

CROSS REFERENCE TO RELATED APPLICATIONS

This application is a national phase of PCT application No. PCT/JP2020/002021, filed on 22 Jan. 2020, which claims priority from Japanese patent application No. 2019-065499, filed on 29 Mar. 2019, all of which are incorporated herein by reference.

TECHNICAL FIELD

The present disclosure relates to a lubricant, an electric contact, a connector terminal, and a wire harness.

BACKGROUND

In electric contacts included in metal members such as connector terminal, a metal layer is often formed on a surface of a substrate during processes such as plating. A metal layer like this functions to improve the electric connection characteristics of electric contacts. In particular, if an Ag layer or an Au layer is arranged in an electric contact, stable electric connection characteristics are obtained in the electric contact because such metals are insusceptible to oxidation. However, if the electric contacts are provided with a metal layer on their surface, the metal layer may adhere to each other during sliding between electric contacts, and thus the friction coefficient at the electric contact may increase. The adhesion between metal layers may also cause the metal layers to be worn. In particular, if an Ag layer or an Au layer is arranged on the surface of an electric contact, the increase of friction coefficient and wear in the metal layer that occur due to adhesion of such metals may get serious because oxide films are hardly formed on the surface of Ag and Au. If the friction coefficient of the electric contact increases in a connector terminal, an intense force (insertion force) may be required for engagement of the connecter terminal performed by the sliding. Particularly in a multipolar connector including a large number of connector terminals, more intense insertion force is required for a larger number of poles.

To address these problems, a lubricant is applied onto a surface of an electric contact to decrease the friction coefficient at the electric contact and prevent wear of the metal layers that may occur due to sliding. As the lubricant applied to an electric contact, a composition is used which includes additives added to the base oil appropriately diluted with a solvent. For example, a lubricant has been conventionally used which includes fluororesin particles as an additive added to the base oil. Fluororesin particles function to decrease the friction coefficient between electric contacts and prevent wear of the metal layer on the surface of the electric contact. If resin particles with sufficiently small grain size are used as the fluororesin particles and if the amount of the lubricant to be applied is controlled, excellent characteristics for electric connection between electric contacts can be secured and the friction coefficient can be controlled low at the same time.

As prior art in which a lubricant containing fluororesin particles is applied to an electric contact, Patent Document 1 discloses an example of a material for a connector electric contact in which fluororesin fine particles and a fluorine oil are coated on the surface of a conductive substrate. In the prior art, the fine particles of the fluororesin including the polytetrafluoroethylene (polytetrafluoroethylene, PTFE) are used as fluorinated resin fine particles.

PRIOR ART DOCUMENT

Patent Document

Patent Document 1: JP 2005-019103 A
Patent Document 2: JP 2012-238584 A
Patent Document 3: WO 2010/044386
Patent Document 4: JP 2009-062464 A
Patent Document 5: JP 2007-326996 A
Patent Document 6: JP 2005-019103 A
Patent Document 7: JP 2006-173059 A
Patent Document 8: JP 2006-241386 A
Patent Document 9: JP 2005-232433 A
Patent Document 10: JP 2003-073686 A
Patent Document 11: JP H08-002285 A
Patent Document 12: JP S59-142293 A
Patent Document 13: JP S59-142292 A
Patent Document 14: JP S59-142291 A
Patent Document 15: JP S50-030645 B

SUMMARY OF THE INVENTION

Problems to be Solved

In lubricants containing fluororesin particles, fluorine oils such as perfluoroether oil are used as the base oil as disclosed in Patent Document 1 in most cases. If the wettability between the fluororesin particles and the base oil is insufficient, it becomes difficult to disperse resin particles on the surface of a subject and maintain the state in which the resin particles are adhered to the surface; fluororesin particles such as polytetrafluoroethylene (PTFE) have a high wettability with fluorine oils. Accordingly, in lubricants containing fluororesin particles, fluorine oils have been widely used as the base oil. However, fluorine oils are generally costly; and if a fluorine oil is used as the lubricant, the lubricant and a connector terminal to which the lubricant is applied may become costly.

To address this problem, an object of the present disclosure is to provide a lubricant capable of dispersing particles containing fluororesin onto the surface of a subject for adhesion of the particles to the surface without requiring use of fluorine oils as a base oil; an electric contact having the lubricant on a surface thereof; and a connector terminal and a wire harness including the electric contact.

Means to Solve the Problem

The lubricant according to the present disclosure contains a base oil; and resin particles containing trifluoroethylene resin, the content of the resin particles is 10% by mass or more in relation to the mass of the base oil.

The electric contact according to the present disclosure uses a metal material as the substrate and electrically contacts other conductive member, and has a layer of the lubricant on the surface of the substrate. The connector terminal according to the present disclosure includes the electric contact at a location of electric contact with a counterpart connector terminal. The wire harness according to the present disclosure includes the connector terminal.

Effect of the Invention

The lubricant according to the present disclosure is capable of dispersing particles containing fluororesin on the surface of a subject and adhere the particles on the surface without requiring use of fluorine oils as the base oil. The electric contact according to the present disclosure includes the lubricant on the surface. The connector terminal and the wire harness according to the present disclosure include the electric contact.

DETAILED DESCRIPTION TO EXECUTE THE INVENTION

Figure 1:
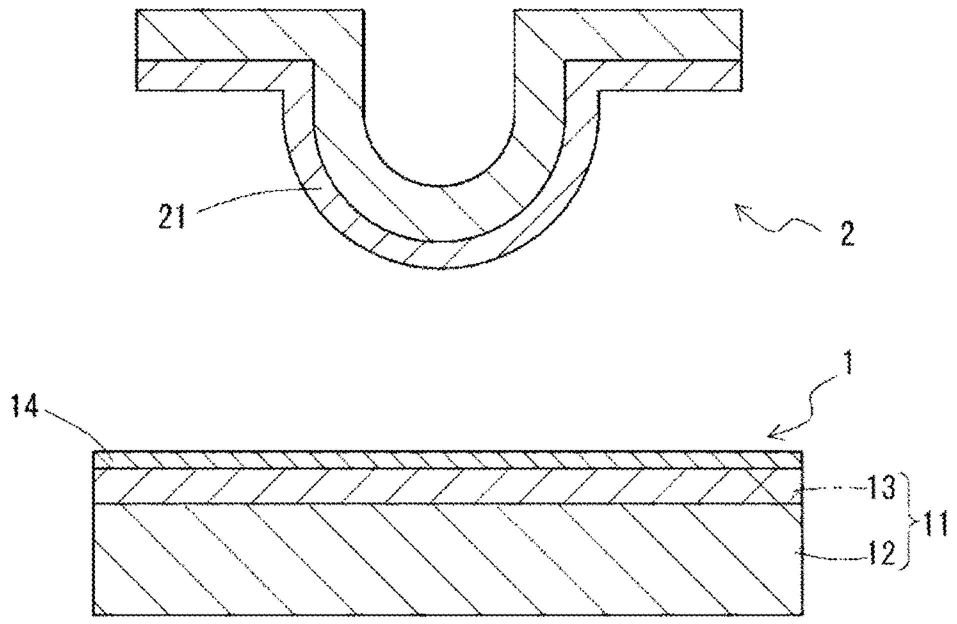
FIG. 1 is a cross section schematically illustrating an electric contact according to an embodiment of the present disclosure together with a counterpart electric contact.

To begin with, embodiments of the present disclosure will be enumerated and described.

A lubricant according to the present disclosure contains a base oil; and resin particles containing trifluoroethylene resin, and the content of the resin particles is 10% by mass or more in relation to the mass of the base oil.

The lubricant contains resin particles including trifluoroethylene resin as a material including fluororesin. Different from PTFE and the like, a trifluoroethylene resin exhibits a high wettability to various oils such as hydrocarbon oil. Accordingly, the present disclosure is capable of preparing a lubricant in which the base oil contains resin particles dispersed at a high homogeneity without requiring use of a costly fluorine oils as the base oil composing the lubricant. Moreover, the prepared lubricant is arranged on a surface of a subject such as an electric contact point or the like of a connector terminal by the method such as coating, and thus the resin particles can be dispersed on and adhered to the surface of a subject at a high homogeneity. The resin particles contribute to the decrease of friction coefficient on the surface of a subject and prevention of wear of the surface. Further, the content of the resin particles in the lubricant is controlled to 10% by mass or more in relation to the mass of the base oil, and thus the lubricant exerts high effects of suppressing the friction coefficient on the surface and prevention of wear of the surface.

In the present embodiment, the content of the resin particles is preferably 30% by mass or more in relation to the mass of the base oil. With this configuration, yet higher effects exerted by the lubricant can be obtained for decreasing the friction coefficient and prevention of wear of the surface.

Further, the lubricant may preferably contain a volatile solvent. In this configuration, the lubricant is diluted with the volatile solvent, enabling control of the viscosity of the lubricant. The lubricant is diluted with the volatile solvent for control of viscosity; which makes it easier for a layer of the lubricant to be formed in the form of a film in arranging the lubricant on the surface of a subject by a method such as coating. In addition, the thickness of the film can be simply and easily adjusted. Different from PTFE and the like, trifluoroethylene resins have a high wettability to various kinds of solvents, and thus it is unnecessary to use a costly fluorine solvent for the dilution.

The volatile solvent may preferably include water. If the volatile solvent includes water, it becomes easier for resin particles to be dispersed in the lubricant including the volatile solvent. As a result, the resin particles can be easily dispersed on the surface of a subject at a high homogeneity when the lubricant is arranged on the surface of the subject.

It is preferable if the base oil be a hydrocarbon oil. As described above, the resin particles contained in the lubricant contains trifluoroethylene resin, and thus the lubricant is imparted with a high wettability to the hydrocarbon oil that is the base oil and, which makes it easy for the resin particles to be dispersed in the base oil. A hydrocarbon oil is a low-cost material, and thus the cost for preparing a lubricant becomes low if a hydrocarbon oil is used as the base oil.

It is preferable if the trifluoroethylene resin be polychlorotrifluoroethylene. Polychlorotrifluoroethylene is a highly available trifluoroethylene resin, which enables the lubricant to exert a high wettability to the base oil and is highly stable in the form of particles.

It is preferable if the mean grain size of the resin particles be 1 μm or more and 50 or less. With this configuration, the resin particles exert high effects for decrease of the friction coefficient and prevention of wear on the surface of the subject, and also exert another effect of hardly interfering with the conduction of electricity on the surface of the subject.

It is preferable if the content of the resin particles be 100% by mass or less in relation to the mass of the base oil. With this configuration, the effects can be obtained for decreasing the friction coefficient and preventing the wear on the surface without requiring an excessive load of resin particles contained in the lubricant.

The electric contact according to the present disclosure is an electric contact including a metal material as the substrate and electrically contacts other conductive members, including a layer of the lubricant according to the present disclosure on the surface of the substrate. The lubricant containing the resin particles including a trifluoroethylene resin by 10% by mass or more in relation to the base oil on the surface of an electric contact, thereby it is made possible to obtain a low friction coefficient if the electric contact is slid which contacting other conductive member or the like and also it becomes hard to case wear of the metal material composing the surface of the electric contact. The resin particles contained in the lubricant contains a trifluoroethylene resin, and thus it is made easier for the resin particles to adhere to the surface of the electric contact at a highly homogeneously dispersed state due to the wettability of the resin particles to the base oil even if no fluorine oil is contained as the base oil; thereby the decrease of the friction coefficient and prevention of wear on the surface of the electric contact can be effectively achieved.

In this configuration, it is preferable if the abundance of elements determined by a method in which an electron beam is incident normally to the surface of the electric contact at an acceleration voltage of 15 kV and characteristic x-rays generated thereby is analyzed be expressed as follows in the unit of atomic % (at %):

$$[F]/[M] \geq 0.2$$

where [F] denotes the abundance of F atoms; and [M] denotes the abundance of the metal atoms composing the substrate. With this configuration, the resin particles are distributed on the surface of the electric contact in a sufficient amount, and thus high effects of decreasing the friction coefficient and prevention of wear at the electric contact can be obtained.

It is preferable if the substrate include at least one selected from the group consisting of Ag, Au, and Cu—Sn alloy, in the form of being exposed on the surface. With this configuration, on the surface on which the metal is exposed, the resin particles contained in the lubricant effectively contribute to the decrease of the friction coefficient and prevention of wear on the surface of the electric contact on which the metal is exposed.

In this configuration, it is preferable if the abundance of elements determined by a method in which an electron beam is incident normally to the surface of the electric contact at an acceleration voltage of 15 kV and characteristic x-rays generated thereby is analyzed be expressed as follows in the unit of at %:

$$[F]/[M] \leq 2.0$$

where [F] denotes the abundance of F atoms; [M] denotes the abundance of the metal atom composing the substrate. With this configuration, effects of decreasing the friction coefficient and preventing wear on the surface can be obtained at the electric contact without requiring an excessive amount of resin particles to be contained in the lubricant and also without requiring an excessive amount of the lubricant to be arranged in the electric contact.

The connector terminal according to the present disclosure includes the electric contact according to the present disclosure at a location of electric contact with a counterpart connector terminal. In the present disclosure, the lubricant containing the resin particles containing a trifluoroethylene resin by 10% by mass or more in relation to the base oil in the electric contact of the connector terminal, and thus the friction coefficient between the electric contacts can be decreased and wear of the metal material composing the surface of the electric contact can be prevented during sliding of the connector terminal against the counterpart connector terminal for engagement or other purposes. With the lubricant containing a trifluoroethylene resin, it is made easy for the resin particles to adhere to the surface of the electric contact in a state it is highly homogeneously dispersed due to the wettability of the resin particles to the base oil without using a fluorine oil as the base oil, and thus the present disclosure is capable of reducing the production cost as an effect of the entire connector terminal including the lubricant applied thereto.

It is preferable if the connector terminal be a male connector terminal or a female connector terminal connected and engaged to the counterpart connector terminal. With this configuration, the friction coefficient is decreased when the connector terminal according to the present disclosure and the counterpart connector terminal are slid for the engagement, and thus the force required for the engagement is reduced. In addition, the resin particles are transferred also to the electric contact of the counterpart connector terminal during sliding, and thus wear on the surface of the counterpart connector terminal also can be prevented.

It is preferable if the particle form of the resin particles be broken when the electric contact is brought into contact with the surface of the counterpart connector terminal for sliding. In this configuration, the resin particles are broken and adhere to the surface of the electric contact with their component being flared, and thus the decrease of the friction coefficient and the prevention of surface wear can be particularly effectively achieved on the surface of the electric contact.

The wire harness according to the present disclosure includes the connector terminal according to the present disclosure. The lubricant containing the resin particles containing a trifluoroethylene resin by 10% by mass or more in relation to the base oil at the electric contact of the connector terminal composing the wire harness, and thus the decrease of the friction coefficient and the prevention of surface wear can be achieved with the resin particles being dispersed on and adhered to the surface of the electric contact of the connector terminal composing the wire harness without requiring use of a fluorine oil as the base oil.

Detailed Description of Embodiment

Now, embodiments of the present disclosure will be described in detail below with reference to the attached drawings. The expression “includes as the primary component” used for a specific component for the constituent composition of a composition or an alloy herein refers to an embodiment in which the component is contained in 50% by mass or more in relation to the entire subject.

<Lubricant>

To begin with, a lubricant according to an embodiment of the present disclosure will be described. The lubricant according to an embodiment of the present disclosure contains a base oil and resin particles, and further contains a volatile solvent as an optional component. The resin particles contain a trifluoroethylene resin. The content of the resin particles in the lubricant is 10% by mass or more in relation to the mass of the base oil. The lubricant contains a specific amount of the resin particles containing a trifluoroethylene resin, and with this configuration, the resin particles can be dispersed in the base oil well, and thus a high effect can be obtained for improving the friction characteristics when the lubricant is arranged on the surface of a subject such as metal surface. First, the components will be described one by one.

(Component of the Lubricant)

(1) Base Oil

The base oil is a material for dispersing the resin particles in the lubricant. The base oil exerts a lubricant action when a film of the lubricant is formed on the surface of a subject and functions to maintain the state of the resin particles in which the resin particles are adhered to the surface of the subject. Further, the base oil covers the surface of a subject composed of a metal or other material functions to shields the subject surface from direct contact with the surrounding environment and also prevent decomposition of the subject surface such as oxidation. Note that the term “oil” herein includes not only oil that is in the form of liquid at ordinary temperatures but also substance such as “fat”, which is solid at ordinary temperatures.

The base oil is not limited to a particular type of oil, and mineral oil, synthetic oil, animal oil, or vegetable oil can be used. A mineral oil is an oil produced by fractioning and purifying coal oil components and thus appropriately reforming the coal oil, and examples of such mineral oil include paraffin mineral oil and naphthenic mineral oil. Examples of the synthetic oil include various chemically synthesized products, such as hydrocarbon oil, ester oil, ether oil, and silicone oil. Examples of the animal oil and the vegetable oil include oils including animal and vegetable oils fats as the raw material, such as vegetable oils such as castor oil and palm oil and beef tallow. Alternatively, an isomerized wax oil obtained by hydroisomerization of a wax including mineral oil or the like as the raw material can be used as the base oil.

It is preferable if the base oil include a mineral oil or a hydrocarbon oil that can be used as a synthetic oil, among those mentioned above. Hydrocarbon oils are a liquid with a low steam pressure which is stable for a long term, and has an extremely low reactivity with resin particles containing a trifluoroethylene resin. Examples of the hydrocarbon oil include linear alkanes such as paraffin; cycloalkanes such as naphthene; α-olefin polymers or hydrides thereof; isobutene polymers or hydrides thereof; polybutene; alkylbenzene; and alkyl naphthalene. Considering the easiness in controlling the viscosity due to the carbon number and the degree of polymerization and other factors, it is preferable to use the linear alkanes such as paraffin and tetradecane or polybutene.

The base oil composing the lubricant may be one lubricant or a mixture of two or more. However, it is preferable if the base oil include a hydrocarbon oil as the primary component; it is more preferable if the base oil is composed only of a hydrocarbon oil. In addition, it is preferable if the base oil include no fluorine oil. This is because fluorine oils are costly and because the resin particles containing a trifluoroethylene resin and thus the wettability of the resin particles to the based on can be secured without using fluorine oil as described below.

It is preferable if the base oil have the viscosity of 2 $mm^2/s$ or more. It is more preferable if the base oil have the viscosity of 10 $mm^2/s$ or more, yet more preferably 100 $mm^2/s$ or more. With the configuration including the base oil having the viscosity, a viscosity appropriate for a lubricant can be secured, thus the lubricant does not flow out or would not scatter when it is arranged on the surface of the subject, making it easier to be stably retained as a film on the surface of the subject. On the other hand, it is preferable if the viscosity of the base oil be 3,000 $mm^2/s$ or less. It is more preferable if the viscosity be 1,000 $mm^2/s$ or less, yet more preferably 500 $mm^2/s$ or less. In this configuration, the base oil has the viscosity described above, thus a fluidity appropriate for a lubricant can be secured in the state in which the lubricant is appropriately diluted with the volatile solvent, and thus it becomes easier to arrange the lubricant on the surface of the subject by coating as a film. In addition, it becomes easier to control the film thickness. In the present embodiment, the viscosity of the base oil refers to a value of kinematic viscosity measured at 37-40° C.

(2) Resin Particles

The resin particles according to the present embodiment contain a trifluoroethylene resin. A trifluoroethylene resin has the structure expressed by the following Formula (1) in the molecular structure. In the trifluoroethylene resin, the term X of Formula (1) refers to an arbitrary atom other than F or an atom group not containing F. The trifluoroethylene resin may have a structure expressed by the Formula (1) as a part of the molecular structure; it is preferable if the trifluoroethylene resin be composed solely of the structure expressed by Formula (1) except for the terminal parts. Polychlorotrifluoroethylene (PCTFE) including solely the structure of Formula (1) in which X is Cl (chlorine atom) except for the terminal part is generally easily available as the trifluoroethylene resin.

[Formula 1]

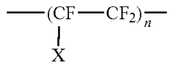

(1)

The resin particles containing the trifluoroethylene resin as a fluororesin are contained in the lubricant, and thus the friction characteristics of the surface of the subject can be improved when the lubricant is arranged on the surface of the subject. In other words, the resin particles contribute to decrease the friction coefficient during the sliding between the surface of the subject and the surface of another member. In addition, the resin particles contribute to prevent wear of a material composing the surface of the subject such as a metal due to the sliding.

The following resins are commonly known as a fluororesin other than PCTFE:

Polytetrafluoroethylene (PolyTetraFluoroEthylene, PTFE)

Tetrafluoroethylene-ethylene polymer (Ethylene-TetraFluoroEthylene copolymer, ETFE)

Tetrafluoroethylene PerFluoroAlkylvinylether polymer (tetrafluoroethylene-PerFluoroAlkylvinylether copolymer, PFA)

Tetrafluoroethylene hexafluoropropylene copolymer (Fluorinated Ethylene-Propylene copolymer, FEP)

Polyvinylidene fluoride (PolyVinylidene DiFluoride, PVDF)

[Formula 2]

$-(CF_2-CF_2)_n-$

PTFE $-(CH_2-CH_2)-(CF_2-CF_2)-$

ETFE

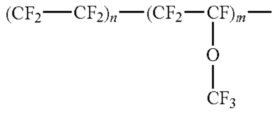

PFA

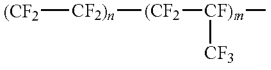

FEP $-(CH_2-CF_2)_n-$

PVDF

Fluororesins including tetrafluoroethylene as a structural unit such as PTFE, ETFE, PFA, and FEP, particularly PTFE composed only of tetrafluoroethylene, have a high wettability to fluorine oils, however, their wettability to oils not containing a fluorine oil such as hydrocarbon oil is low. On the contrary, trifluoroethylene resins such as PCTFE have a high wettability not only to fluorine oils but also to oils other than fluorine oils such as hydrocarbon oil. Fluorine resins including bifluoroethylene as a structural unit such as PVDF are difficult to maintain their stable state when turned into particles; while trifluoroethylene resins such as PCTFE maintain their stable state when turned into particles. For these reasons, the resin particles contained in the lubricant according to the present embodiment contain the trifluoroethylene resin instead of tetrafluoroethylene resin or bifluoroethylene resin as the fluororesin. Note that the trifluoroethylene resin may have a structure of the Formula (1) as a part of the molecular structure as described above; however, even in such a configuration, it is preferable if no tetrafluoroethylene structure or no bifluoroethylene structure be included in the molecular structure.

The resin particles may contain an additional component as long as it contains a trifluoroethylene resin. Examples of such other components include other fluororesins such as PTFE, ETFE, PFA, FEP, and PVDF and silicone resins. However, to intensely exert the characteristics of trifluoroethylene resin such as wettability to base oils and stability in the particles form, it is preferable if the resin particles include a trifluoroethylene resin as the primary component. It is more preferable if the polymer component composing the resin particles include trifluoroethylene resin only.

In the lubricant according to the present embodiment, the content of the resin particle is 10% by mass or more in relation to the mass of the base oil. In the present embodiment, the lubricant contains the resin particles by 10% by mass or more in relation to the base oil, and thus the resin particles are distributed on the surface of the subject at a sufficient density when the lubricant is arranged on the surface of the subject in such a form as a film. The resin particles exist on the surface of the subject at a high density, and thus the decrease of the friction coefficient and prevention of wear on the surface of the subject are effectively achieved. If the content of the resin particles is 10% by mass or less in relation to the mass of the base oil, no remarkable effects of decreasing the friction coefficient and preventing wear on the surface of the subject such as electric contact may be obtained as described with reference to the Examples. Further, if the content of the resin particles is 30% by mass or more in relation to the mass of the base oil, the effects of decreasing the friction coefficient and preventing wear can be further enhanced.

On the other hand, the content of the resin particles in the lubricant is not particularly limited to any upper limit. However, it is preferable if the content of the resin particles be controlled at 100% by mass or less in relation to the mass of the base oil. With this configuration, the material cost for the lubricant that may otherwise increase if an excessive amount of resin particles is contained can be prevented, also preventing saturation of the effects such as decreased friction coefficient. In addition, it becomes easy to prevent the characteristics of the subject such as the conductivity if the subject is an electric contact being influenced by resin particles dispersed on the surface of the subject at excessively high density. To increase the above effects, it is more preferable if the content of the resin particles be 50% by mass or less in relation to the mass of the base oil.

The grain size of the resin particles is not particularly limited; however, 1 μm or more of the grain size is preferable. With the configuration in which the grain size is 1 μm or more, the resin particles hardly sink in the fine indented structure on the surface of the subject when the lubricant is arranged on the surface of the subject in such a form as a film, and thus effectively contributing to the decrease of the friction coefficient and the prevention of wear. If the grain size of the resin particles is 3 μm or more or 5 μm or more, the contribution by the resin particles to the decrease of the friction coefficient and the prevention of wear can be further enhanced.

On the other hand, it is preferable if the grain size of the resin particles be 100 μm or less. With the grain size of 100 μm or less, the present embodiment can prevent influence from the resin particles on the characteristics of the subject such as the conductivity if the subject is an electric contact. If the subject is an electric contact, the apparent area of a region of contact with the counterpart electric contact is about a few hundred micrometers, and if the grain size of the resin particles is 100 μm or less when the resin particles are arranged in the contact region, the resin particles hardly impair the conduction between the electric contacts. To further increase these effects, it is more preferable if the grain size of the resin particles be 50 μm or less. In the present embodiment, the grain size of the resin particles can be assessed as the center grain size (D50), and is measured by measurement of grain distribution using laser diffraction/scatter measurement, for example.

(3) Volatile Solvent

The lubricant according to the present embodiment may include the base oil and the resin particles only, however, it is preferable to further contain a volatile solvent. If the volatile solvent is contained, the viscosity of the lubricant can be controlled. Even if the viscosity of the base oil is high, the viscosity of the entire lubricant may be decreased by dilution with the volatile solvent, and thus it becomes easier for the lubricant to be arranged on the surface of the subject in the form of a coating film, by a method such as coating and immersion. In particular, with the lubricant diluted with the volatile solvent, it becomes easier to form a thin film of the lubricant on the subject with the homogeneous thickness; and further, if the lubricant is formed as a thin film, it becomes easy to disperse the resin particles on the surface of the subject at a high homogeneity. The volatile solvent gets volatilized after the lubricant is arranged on the surface of the subject as a film; the film of the lubricant after the solvent is volatilized obtains a high viscosity achieved because the lubricant is not diluted with the volatile solvent. With this configuration, the lubricant hardly flows out or becomes scattered from the location of formation of the film, and thus the film of the lubricant can be stably retained on the surface of the subject.

The volatile solvent is not particularly limited as long as it is a liquid with the volatility higher than that of the base oil, i.e., a steam pressure higher than that of the base oil. The volatile solvent usually has a viscosity lower than that of the base oil, in cooperation with the volatility higher than that of the base oil. In addition, it is preferable if the volatile solvent have high compatibility to the base oil. Examples of the volatile solvent having a high compatibility to hydrocarbon base oil include organic solvents such as hydrocarbon solvent, ester solvent, ether solvent, ketone solvent, alcohol solvent, and halogenated hydrocarbon solvent. Among these organic solvents, organic solvents such as hydrocarbon solvent, ether solvent, and ketone solvent are particularly excellent in terms of the compatibility to the base oil and the volatility. It is preferable if an organic solvent with a relatively low carbon number, such as (cyclo)hexane for the hydrocarbon organic solvent; diisopropyl ether for the ether organic solvent; and acetone for the ketone organic solvent, is used. Particularly in a configuration in which a relatively highly polymeric base oil such as high-viscosity paraffin is used, it is preferable if an ether organic solvent such as diisopropyl ether be used as the volatile solvent.

The volatile solvent added to the lubricant may be one or a mixture of two or more. However, it is preferable if the volatile solvent include no fluorine organic solvent. Similar to fluorine oils, fluorine organic solvents are costly; in the lubricant according to the present embodiment, the resin particles contain trifluoroethylene resin, and thus the resin particles can be sufficiently dispersed in the solvent without using fluorine organic solvent. This is because different from the fluororesin including tetrafluoroethylene such as PTFE in the structural unit, trifluoroethylene resins exert a high wettability for a solvent including no fluorine.

The content of the volatile solvent in the lubricant is not particularly limited. The loads of the volatile solvent may be set in consideration of factors such as the viscosity of the base oil and the film thickness of the lubricant layer to be formed to dilute the lubricant to an appropriate concentration and viscosity. As the load of the volatile solvent is increased, the viscosity of the lubricant is decreased, and the lubricant becomes more suitable for forming a thin lubricant film.

It is preferable if the volatile solvent contain a small amount of water. In the volatile solvent, the resin particles may cause aggregation and precipitation, however, in the configuration in which the volatile solvent contains water, aggregation and precipitation of the resin particles can be prevented, and thus it becomes easier to disperse the resin particles in the volatile solvent at a high homogeneity. It is considered that this phenomenon is caused because water is contained in the volatile solvent, thus a hydroxyl group is formed on the surface of the resin particles, resulting in the surface of the resin particles is charged with negative charge. Because the resin particles electrostatically repulse, aggregation and precipitation hardly occur, and thus the resin particles are dispersed in the volatile solvent at a high homogeneity.

To obtain an effect of sufficiently promoted dispersion of the resin particles, examples of the configuration for the content of water include 0.1% by mass or more, more preferably 0.5% by mass or more. If the volatile solvent is a ketone solvent or an ether solvent, water of 0.1% by mass or more is often contained as an impurity. On the other hand, to prevent influence from water to the lubricant and the subject such as residual water to the surface of the subject, it is preferable if the content of the water be 3% by mass or less, more preferably 1% by mass, in relation to the mass of the volatile solvent.

(4) Other Components

The lubricant according to the present embodiment may further contain other components other than the base oil, resin particles, and the volatile solvent within the scope not impairing the characteristics of the lubricant. Examples of the additive that can be added to the lubricant include antioxidant, coloring agent, anticorrosive, preservative, and surfactant.

However, no additive for further improvement of the friction characteristics such as wear reduction agent and lubrication adjuvant may be contained because the resin particles exert a high effect of improving the friction characteristics. In addition, no additive that assist the dispersion of the resin particles such as dispersion agent may be contained because the resin particles exert a high dispersion characteristic in the base oil or in the volatile solvent. Further, no additive for controlling the lubricant such as the viscosity adjusting agent and thickener may be contained in the lubricant because the viscosity can be highly flexibly controlled by choosing the viscosity of the base oil and adding a volatile solvent. It is preferable if the lubricant contain no additive other than the base oil, the resin particles, and the volatile solvent (including configurations in which water is contained), and if such an additive is contained, it is preferable if the total amount of the additive(s) be controlled to 5% by mass or less, more preferably 1% by mass or less, in relation to the mass of the base oil.

(Method for Preparing the Lubricant and the Usage)

The lubricant according to the present embodiment is prepared by mixing the base oil and the resin particles and the optional components including the volatile solvent and the additives at specific ratios.

The order of adding the components is not particularly limited for the preparation of the lubricant; however, it is preferable if the resin particles be added to the volatile solvent first and the mixture be stirred to disperse the resin particles, when a volatile solvent is used. The lubricant can be prepared by adding the base oil to the mixture in which the resin particles are sufficiently dispersed. In this manner, the resin particles can be easily dispersed in the lubricant at a high homogeneity. The dispersion of the resin particles can be increased by adding water to the volatile solvent as described above; and in such a configuration, it is preferable if water be added to the volatile solvent before addition of the resin particles and the resulting mixture be well-stirred to prepare a sufficient mixture.

The prepared lubricant can be arranged and used on the surface of the subject in the form of a film. The method of forming a film of the lubricant on the surface of the subject is not particularly limited, however, examples of such a method include application using brushes; spraying using a spraying device; immersion into the liquid; and addition by dropping of the lubricant in the form of liquid. The method may be chosen in consideration of the factors such as the viscosity of the lubricant and the film thickness of the lubrication layer to be formed.

In a configuration in which the lubricant contains a volatile solvent, the volatile solvent is removed by volatilization after the film of the lubricant is formed on the surface of the subject. In this process, heating may be appropriately performed. If the volatile solvent contains water, the water is volatilized together with the volatile solvent. The volatility of the water is increased by the azeotropy caused by mixing it with the volatile solvent.

(Characteristics of the Lubricant)

As described above, the lubricant according to the present embodiment contains the resin particles containing a trifluoroethylene resin by 10% by mass or more in relation to the base oil. The lubricant is formed in the form of a film and arranged on the surface of the subject, and thus the resin particles function to improve the friction characteristics on the surface of the subject. Specifically, other object is brought into contact with the surface of the subject on including the lubricant film thereon for sliding, and resin particles exist at the point of contact during the sliding; thus the friction coefficient is decreased. In addition, the present embodiment prevents wear of the material such as metal exposed onto the surface of the subject that may occur due to the sliding.

The trifluoroethylene resin contained in the resin particles exerts a high wettability to the base oil composed of hydrocarbon oil. Accordingly, the resin particles are easily dispersed in the base oil at a high homogeneity. The lubricant in which the resin particles are dispersed at a high homogeneity is arranged on the surface of the subject as a film, the resin particles are dispersed on the surface of the subject at a high homogeneity. In a configuration in which a thin film of the lubricant is formed, the resin particles are easily dispersed on the surface of the subject at a high homogeneity.

The high wettability of the resin particles containing a trifluoroethylene resin to the base oil exert a high effect also of retaining the resin particles dispersed on the surface of the subject to the state in which they are adhered to the surface of the subject. This is because the base oil is spread on the interface between the resin particles and the subject in the form of an extremely thin film, and it is thus made possible to have the resin particles intensely adhere to the surface of the subject via the layer of the base oil.

As described above, the resin particles have a high wettability to the base oil, thus the dispersibility and the adhesion of the resin particles on and to the surface of the subject become high, resulting in exerting an excellent friction characteristics improvement effect. In a configuration in which an oil not containing fluorine atoms such as hydrocarbon oils is used as the base oil, the trifluoroethylene resin contained in the resin particles exhibit a high wettability to the base oil. The cost for hydrocarbon oils is low compared with various oils and fats such as fluorine oils, and hydrocarbon oils are widely used as a base oil for a lubricant. Further, trifluoroethylene resins exert a high wettability also to volatile solvents such as hydrocarbon solvent, ether solvent, and ketone solvent. Accordingly, in a configuration in which such volatile solvents are added to the lubricant, sufficient dispersibility of the resin particles in the lubricant and on the surface of the subject can be secured.

Fluorine resins containing a tetrafluoroethylene such as PTFE, ETFE, PFA, and FEP exert a high wettability to fluorine oils and fluorine solvents; but their wettability to various oils and solvents not containing fluorine such as hydrocarbon oils is usually low. Accordingly, in a configuration in which resin particles composed of a fluororesin containing such a tetrafluoroethylene in the structural unit are contained in the lubricant, it becomes necessary to use a fluorine oil or a fluorine solvent to secure the dispersibility of the resin particles. In this configuration, the material cost for the lubricant may adversely rise because fluorine oils and fluorine solvents are expensive. On the contrary, in the lubricant according to the present embodiment, the resin particles used contain a trifluoroethylene resin, thus it is made unnecessary to use fluorine oils or fluorine solvents to secure the wettability of the resin particles, and if such an oil or solvent is used, the load can be reduced to a small load. As a result, the material cost for the lubricant can be reduced to a low cost.

<Electric Contact>

Next, an electric contact according to an embodiment of the present disclosure will be described as an example of an embodiment in which the lubricant according to the embodiment described above is arranged on the surface of the subject. The electric contact according to the present embodiment is composed of a metal material as the substrate and electrically contacts other conductive member; and includes a layer of the lubricant according to an embodiment of the present disclosure described above formed on the surface of the substrate.

The electric contact according to the present embodiment may be shaped in any shape, and may also be provided to any electric part. In the present embodiment, a flat-plate electric contact 1 as illustrated in FIG. 1 will be described as an example. For example, the flat-plate electric contact 1 composes an electric contact pair with an embossed electric contact 2 as also illustrated in FIG. 1; and electric contact is formed between the surface of the flat-plate electric contact 1 and the top of an emboss 21 of the embossed electric contact 2. Such an electric contact pair composed of the flat-plate electric contact 1 and the embossed electric contact 2 is used as a pair of an engagement type male connector terminal and female connector terminal.

The flat-plate electric contact 1 includes a substrate 11 and a lubrication layer 14, which is exposed onto the uppermost surface and covers the surface of the substrate 11. The substrate 11 may be composed of a single metal material, however, it is preferable to include a substrate material 12 and a cover layer 13 which covers the surface of the substrate material 12. The cover layer 13 includes a metal material different from the substrate material 12, and is formed as a layer less thick than the substrate material 12.

The component of the substrate material 12 is not limited to a particular type of metal; and examples of the metal constituting the substrate material 12 include Cu or a Cu alloy; Al or an Al alloy; and Fe or an Fe Alloy, which are commonly used as the substrate material 12 for an electric connection member. Among these metals, Cu or a Cu alloy that are most commonly used can be suitably used as the substrate material 12.

However, it is preferable if the substrate 11 composing the flat-plate electric contact 1 include at least one of Ag, Au, and Cu—Sn alloy as the material composing the surface layer portion in the form of the cover layer 13 or the like. In an embodiment in which the cover layer 13 contains at least one of Ag and Au, it is preferable if the cover layer 13 be constituted solely by a metal element of Ag or Au or an alloy containing Ag or Au as the primary component, except for the inevitable impurities.

In an alternative embodiment in which the cover layer 13 contains a Cu—Sn alloy, the entire cover layer 13 may be constituted by the Cu—Sn alloy; and in this configuration, it is preferable if the cover layer 13 include a region constituted by a Cu—Sn alloy and a region constituted by Sn in a mixed state, as the alloy material disclosed in JP 2009-52076 A. The region composed of Cu—Sn alloy may be covered with a thin Sn layer. Examples of the composition of the Cu—Sn alloy include $Cu_6Sn_5$, $Cu_3Sn$, and $Cu_4Sn$. The cover layer 13 may include a lamination of a plurality of layers; if such a configuration is employed, it is preferable if the uppermost surface be a layer containing at least one of Ag and Au or a layer containing a Cu—Sn alloy.

A lubrication layer 14 is a layer in which the lubricant according to the present embodiment is arranged as a film. Note that if the lubricant contains a volatile solvent, the volatile solvent is volatilized after the lubrication layer 14 is formed on the surface of the flat-plate electric contact 1, and in this state, the lubrication layer 14 contains no volatile solvent except for the inevitable residues. In the electric contact 1 according to the present embodiment, friction characteristics on the surface of the substrate 11 are improved by the configuration in which the surface of the substrate 11 is covered with the lubricant layer 14. Specifically, during the contact sliding of the electric contact 1 on the embossed electric contact 2, the lubricant layer 14 containing the resin particles exists between the electric contacts 1, 2, and thus the friction coefficient is decreased. In addition, wear of the cover layer 13 is prevented.

The effect of improvement of the friction characteristics exerted by the lubrication layer 14 becomes more intense if the cover layer 13 contains at least one of Ag and Au as described above. Ag and the Au have a high conductivity and are metals that are hardly oxidized; and the cover layer 13 containing Au or Ag is arranged as a layer covering the surface of the electric contact 1, and thus the present embodiment achieves an excellent electric connection characteristic between the electric contact 1 and the electric contact 2 on the surface of the electric contact 1. However, Ag and Au are soft metals and hardly get oxidized, and thus they are easily adhered. Accordingly, if sliding is performed between the surface of the electric contact 1 and the counterpart electric contact 2, the friction coefficient on the surface may adversely increase due to their adhesion. In addition, wear on the surface of the cover layer 13 occurs, making the cover layer 13 to easily get worn. To address these defects, the present embodiment includes the lubricant layer 14 on the surface of the cover layer 13 containing at least one of Ag and Au, making it possible to prevent the increase of the friction coefficient and the advance of wear that may adversely occur due to adhesion of metals described above.

If the cover layer 13 contains a Cu—Sn alloy, which is a hard alloy, and thus the increase in the friction coefficient or surface wear that may otherwise occur due to the adhesion of Ag and Au in the configuration in which the cover layer 13 contains Ag or Au hardly occur. However, in the configuration in which the cover layer 13 contains a Cu—Sn alloy, if the lubricant layer 14 is arranged on the surface of the cover layer 13, a high effect can be obtained for preventing the increase of friction coefficient and the progress of wear. These effects can be obtained also in a configuration in which the cover layer 13 includes a region constituted by a Cu—Sn alloy and a region constituted by Sn in a mixed state.

The thickness of the lubrication layer 14 may be appropriately set in accordance with the degree of lubrication characteristic required and the required degree of improvement in the friction characteristics; and to effectively achieve the improvement in the friction characteristics while preventing exposure of the substrate 11 during sliding, it is preferable if the thickness of the lubricant layer 14 be 0.1 μm or more, more preferably 1 μm or more. On the other hand, to prevent flowing out and scattering of the lubricant from a specific location of the electric contact 1 and to suppress adverse effect from the lubricant to the electric connection characteristics, it is preferable if the thickness of the lubricant layer 14 be 10 μm or less, more preferably 5 μm or less. Particularly if the electric contact 1 is arranged at a location close to an optical component, it is preferable to choose a thickness of the lubricant layer 14 less than the thickness of such an optical component to prevent adverse effect from the base oil to the optical component. Note that if the thickness of the lubrication layer 14 is less than the grain size of the resin particles, the resin particles may protrude from the film of the dispersed base oil outwards (toward the upper portion in FIG. 1), and the thickness of the lubricant layer 14 is assessed as the thickness of the film in which the base oil is spread.

The density of the resin particles on the surface of the substrate 11 affects the characteristic of the lubrication layer 14. The density of the resin particles on the surface of the substrate 11 can be assessed based on the ratio of F atoms and the metal atoms on the surface of the substrate 11. For example, spectroscopy methods such as electron dispersive x-ray spectroscopy (EDS), which is a spectroscopy capable of determining the abundance of the elements by performing an analysis on the characteristic x-rays generated when electrons are made incident to the surface of a subject, can be used for the assessment. Specifically, the abundance of elements determined by analysis on the characteristic x-rays can be determined with an expression [F]/[M] as the index, where [F] represents a ratio of the number of F atoms and [M] represents the number of metal atoms constituting the metal material of the substrate 11, in the unit of at %. The abundance of metal atoms [M] herein refers to the total abundance of the metal atoms of all the metals composing the substrate 11. Note that if the cover layer 13 is formed on the surface of the substrate material 12 as the substrate 11 the metal atoms determined by EDS are the metal atoms composing the cover layer 13 only. For the assessment, the electron beams may be made normally incident to the surface of the electric contact 1 at an acceleration voltage of 15 kV.

It is preferable if the element ratio [F]/[M] be 0.2 or more ($[F]/[M] \geq 0.2$). If the element ratio [F]/[M] is 0.2 or more, the resin particles are dispersed on the surface of the electric contact 1 at a sufficient density, and thus high effects of decreased friction coefficient and prevented wear can be obtained. If the element ratio [F]/[M] is 0.3 or more, more preferably 0.5 or more, the effects can be further enhanced.

On the contrary, if the resin particles are distributed on the surface of the electric contact 1 at an excessive density, the effects such as decreased friction coefficient may be saturated, and also the cost for forming the lubricant layer 14 may adversely increase. In addition, the threat of the resin particles affecting the conductivity between the between electric contacts 1, 2 may arise. To prevent these phenomena, it is preferable to control the element ratio [F]/[M] at 2.0 or less, more preferably 1.0 or less.

As described above, the electric contact according to the present embodiment is not limited to a particular shape; and it is preferable if the lubricant layer 14 be formed on the electric contact 1 or 2 that composes the electric contact pair for which the area of contact of the counterpart electric contact (in this configuration, the embossed electric contact 2) is wider of the two during the sliding, such as the electric contact 1. This is because with this configuration, the lubricant layer 14 is formed in a wide area for sliding and the resin particles may be allowed to be distributed in the wide area for sliding, thus making a large number of resin particles contribute to the decrease of the friction coefficient and the prevention of wear during the sliding. During sliding in which the flat-plate electric contact 1 and the embossed electric contact 2 are brought into contact, the embossed electric contact 2 always contacts the flat-plate electric contact 1 in the small region at the top of the emboss 21, while the location of contact of the embossed electric contact 2 on the surface of the flat-plate electric contact 1 continuously changes as the sliding progresses. In the flat-plate electric contact 1, if the lubricant layer 14 is formed and the resin particles are dispersed widely in the entire region in which the embossed electric contact 2 may contact the flat-plate electric contact 1 during sliding, the effects of the decrease of the friction coefficient and prevention of wear during sliding can be enhanced compared with a configuration in which the lubricant layer 14 is formed only at the top of the embossed electric contact 2, of which the area is small. Provided, however, if the lubricant layer 14 is formed to the electric contact with the smaller area in the region of contact with the counterpart electric contact (in this configuration, the flat-plate electric contact 1) during sliding, such as the embossed electric contact 2, the effects can be exerted to some extent in decreasing the friction coefficient and preventing wear at the electric contact 2. The lubrication layer 14 may be provided to both the electric contacts 1, 2 composing the electric contact pair.

When the sliding is performed in the state in which the counterpart electric contact 2 is in contact with the surface of the electric contact 1, the state of the resin particles at the time of addition of them to the lubricant may be either maintained or vary. For example, the particle form of the resin particles may be broken after the sliding. When the particle form of the resin particles is broken, the material composing the resin particles, i.e., the material containing a trifluoroethylene resin is spread on the surface of the electric contact 1. The component of the resin particles spread with the broken particle form can also contribute to the decrease of the friction coefficient and the prevention of wear of the electric contact 1, similar to the configuration in which the particle form of the resin particles is maintained. Rather, in this configuration, because the particle form of the resin particles is broken, the area of the region covered with the component of the resin particles on the surface of the substrate 11 is enlarged. In addition, the adhesion of the component of the resin particles on the surface of the substrate 11 can become more intense after the particle form is broken. As a result of the enlarged cover region and the intensified adhesion, the above configuration may achieve higher effects of decrease of friction coefficient and prevention of wear compared with the configuration in which the particle form of the resin particles is maintained.

Further, in a configuration in which the lubricant layer 14 is not formed on the surface of the counterpart electric contact 2 when the electric contact 1 including the lubricant layer 14 on its surface is brought into contact with the counterpart electric contact 2 for sliding, the resin particles are often transferred from the electric contact 1 onto the surface of the counterpart electric contact 2 during the sliding. In this configuration, the resin particles function to decrease the friction coefficient between the contacts 1, 2 and also prevent wear of the metal material on the surface of the substrate not only for the electric contact (the flat-plate electric contact 1) including the lubricant layer 14 on the surface but also for the counterpart electric contact (the embossed electric contact 2).

<Connector Terminal>

Next, the connector terminal according to an embodiment of the present disclosure will be described. The connector terminal according to an embodiment of the present disclosure includes the electric contact according to an embodiment of the disclosure described above at locations of electric contact with the counterpart connector terminal.

The type and the shape of the connector terminal are not particularly limited, and examples of the connector terminal include a male connector terminal or a female connector terminal that is engaged with and connected to a counterpart connector terminal. Suitable examples of the male connector terminal include a connector terminal having the flat-plate electric contact 1 described above; and suitable examples of the female connector terminal include a connector terminal having the embossed electric contact 2 described above.

Figure 2A:
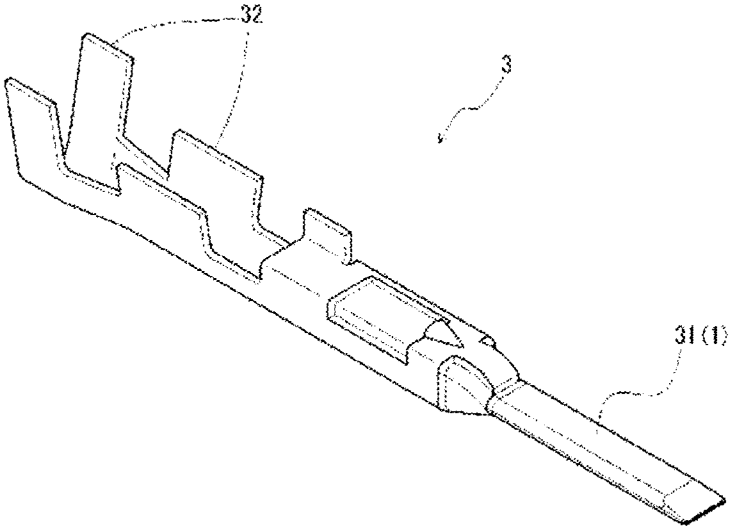
FIG. 2A is a perspective view illustrating a connector terminal according to an embodiment of the present disclosure.

FIG. 2A illustrates an outline configuration of an engaging male connector terminal 3 as an example of the connector terminal according to the present embodiment. The male connector terminal 3 includes a flat-plate tab 31 located to the front thereof, which is inserted to an engagement portion of the female connector terminal (not illustrated) and forms an electric contact with the female connector terminal. In addition, the male connector terminal 3 includes a barrel portion 32 located to the rear of the flat-plate tab 31, which caulks an electric wire (not illustrated) and forms an electric contact and a physical contact between the male connector terminal 3 and the electric wire.

In the male connector terminal 3, the surface of the flat-plate tab 31 functions as the flat-plate electric contact 1 that is the electric contact according to the present embodiment of the present disclosure. Specifically, in the male connector terminal 3, the lubrication layer 14 containing the lubricant according to an embodiment of the present disclosure is provided at least on the surface of the flat-plate tab 31. In addition, it is preferable, in the metal material composing the male connector terminal 3, if the cover layer 13 containing at least one selected from the group consisting of Au, Ag, and a Cu—Sn alloy be formed at least on the surface of the flat-plate tab 31.

For a counterpart connector terminal for the male connector terminal 3, a female connector terminal having the embossed electric contact 2 arranged inside a tubular engagement portion can be used as the electric contact. When the male connector terminal 3 is engaged and connected to the female connector terminal, sliding occurs between the surface of the flat-plate tab 31 of the male connector terminal 3 configured as the flat-plate electric contact 1 and the top of the embossed electric contact 2 of the female connector terminal. In this configuration, the lubricant layer 14 is provided on the surface of the flat-plate tab 31 of the male connector terminal 3, and thus the resin particles are dispersed at the sliding portions, decreasing the friction coefficient during the sliding that occurs when the connection terminals are engaged and connected to each other and preventing wear of the cover layer 13.

With this configuration, the friction coefficient on the surface of the flat-plate electric contact 1 is decreased, and thus the force required for insertion and engagement of the male connector terminal 3 to the female connector terminal (insertion force) is reduced. The reduced insertion force makes the operation for engaging and assembling the connector terminal pair easier. Particularly in a connector having a large number of connector terminals 3, the insertion force required for engagement to the counterpart connector becomes larger for a larger number of the connector terminals 3; however, even in a configuration like this, if the lubricant layer 14 is provided on the surface of the flat-plate electric contact 1 to decrease the friction coefficient on the surface, the insertion force for insertion of the connector can be reduced. The amount of the insertion force to be reduced due to the lubricant layer 14 formed on the electric contact 1 of each connector terminal 3 for the entire connector becomes larger for a larger number of connector terminals 3 included in the connector.

During the sliding between the male connector terminal 3 and the female connector terminal, the particle form of the resin particles contained in the lubricant layer 14 may be broken. As is described above for the flat-plate electric contact 1, if the particle form of the resin particles is broken, the effects of decrease of the friction coefficient and the prevention of wear can be further enhanced. Breaking of the particle form of the resin particles during sliding more easily occurs for a larger contact pressure (contact load) applied between the electrical contacts 1, 2 of the male connector terminal 3 and the female connector terminal. The contact pressure can be controlled by the following parameters. Specifically, the contact pressure can be controlled by the parameters such as: the thickness of the flat-plate tab 31 of the male connector terminal 3; the height of the space for clamping and holding the flat-plate tab 31 of the male connector terminal 3 (the dimension in the direction corresponding to the thickness of the flat-plate tab 31); the radius of the emboss 21 of the embossed electric contact 2 of the female connector terminal; and the magnitude of the elastic force of a spring that presses the embossed electric contact 2 of the female connector terminal against the flat-plate tab 31 of the male connector terminal 3.

As described above, the connector terminal according to the present embodiment is not limited to the engaging male connector terminal 3, and an engaging female connector terminal can be used, for example. In this configuration, the lubricant layer 14 may be provided on the surface of the electric contact that is formed as the embossed electric contact 2 in the engagement portion of the female connector terminal. Alternatively, the lubricant layer 14 may be provided to the electric contacts 1, 2 of both the male connector terminal 3 and the female connector terminal composing the connector terminal pair.

<Wire Harness>

Finally, the wire harness according to an embodiment of the present disclosure will be described. The wire harness according to an embodiment of the present disclosure includes the connector terminal according to an embodiment of the present disclosure described above as a component of the harness.

In the wire harness according to an embodiment of the present disclosure, the connector terminal according to an embodiment of the present disclosure such as the male connector terminal 3 is connected to at least one end of the electric wire, forming an electric wire with terminal. The wire harness may include a plurality of electric wires with terminal. In this configuration, all of the electric wires with terminal composing the wire harness may include the connector terminals according to an embodiment of the present disclosure; or alternatively, some of the electric wires with terminal may include the connector terminal according to an embodiment of the present disclosure.

Figure 2B:
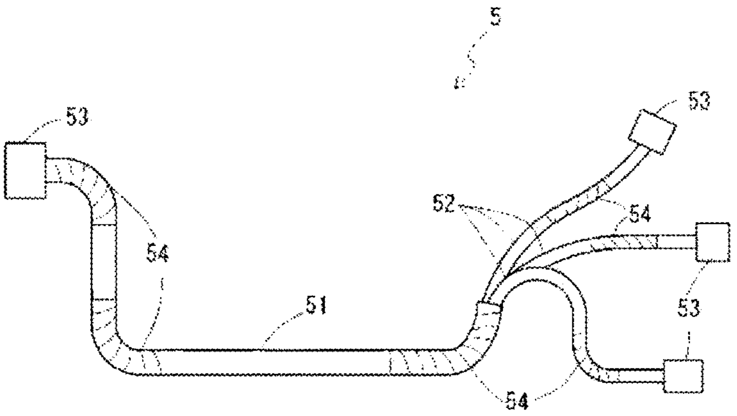
FIG. 2B is a side view illustrating a wire harness according to an embodiment of the present disclosure.

FIG. 2B illustrates an example of the wire harness including a plurality of electric wires with terminal. A wire harness 5 is configured to include three branch harness portions 52 which are branched from the leading edge of a main harness portion 51. In the main harness portion 51, a plurality of electric wires with terminal is bundled. The electric wires with terminal are classified into three groups, each group being bundled at the branch harness portions 52. In the main harness portion 51 and the branch harness portions 52, an adhesive tape 54 is used to bundle the plurality of electric wires with terminal and to retain the bent shape. A connector 53 is provided at the base end portion of the main harness portion 51 and at the leading edge portion of each branch harness portion 52. The connector 53 accommodates the connector terminal installed to the terminal of each electric wire with terminal.

In this configuration, at least a part of the plurality of connector terminals attached to the terminal of a plurality of the electric wires with terminal composing the wire harness 5 corresponds to the connector terminal 3 of the above-described embodiment of the present disclosure. In the electric contact of the connector terminal 3, the lubrication layer 14 containing the lubricant according to an embodiment of the present disclosure is provided on the surface of the cover layer 13. In this configuration, the male connector terminal 3 according to an embodiment of the present disclosure including the lubricant layer 14 on the surface of the electric contact is included as the connector terminal composing the wire harness 5, thus allowing the resin particles to be dispersed at the sliding locations when the connector terminal 3 is engaged and connected to the counterpart connector terminal in the wire harness 5, resulting in obtaining effects of decreasing the friction coefficient and preventing wear of the cover layer 13 during the sliding involved in the engagement connection.

Examples

Now, the present disclosure will be described below with reference to examples. Note that the present invention is not limited to these examples. Hereinbelow, preparation and assessment of the samples were performed in the atmosphere at room temperature unless otherwise noted.

[1] Wettability Between the Base Oil and the Fluororesin

To collect essential information for securing the dispersibility of the resin particles in the lubricant, the wettability between the base oil and the fluororesin was examined.

[Test Method]

First, the wettability various fluororesins and hydrocarbon oils was examined. Specifically, liquid droplets of a high-viscosity paraffin were dropped onto the surface of respective fluororesins molded into a plate-like shape. For the fluororesin, ETFE, PFA, PTFE, and PCTFE were used. For the high-viscosity paraffin, the following was used:

High-viscosity paraffin: High-viscosity type liquid paraffin (kinematic viscosity: 100-120 $mm^2/s$ @ 37.8° C.) (a product of Nacalai Tesque, Inc.)

Photographs were taken of the surface of the fluororesin on which the liquid droplets of the high-viscosity paraffin were dropped from the side. Using the taken photographs, the wettability on the interface was assessed based on the shapes of the liquid droplets. The wettability was assessed lower for liquid droplets with higher mounds of the dome-shaped liquid droplets and larger contact angles; while it was assessed higher for liquid droplets with lower mounds spread in a flat shape and smaller contact angles.

Further, the wettability between the fluororesin and the respectively hydrocarbon oils was assessed for PCTFE and PTFE, among the above fluororesins. Specifically, the wettability was assessed based on the shape of the liquid droplet, using two polybutenes other than the above high-viscosity paraffin in a manner similar to that described above. The following polybutenes were used:

Low-viscosity polybutene: LV-100 (kinematic viscosity: 205 $mm^2/s$ @ 40° C.) (a product of JXTG Nippon Oil & Energy Corporation)

High-viscosity polybutene: HV-35 (kinematic viscosity: 2,300 $mm^2/s$ @ 40° C.) (a product of JXTG Nippon Oil & Energy Corporation)

Figure 3:
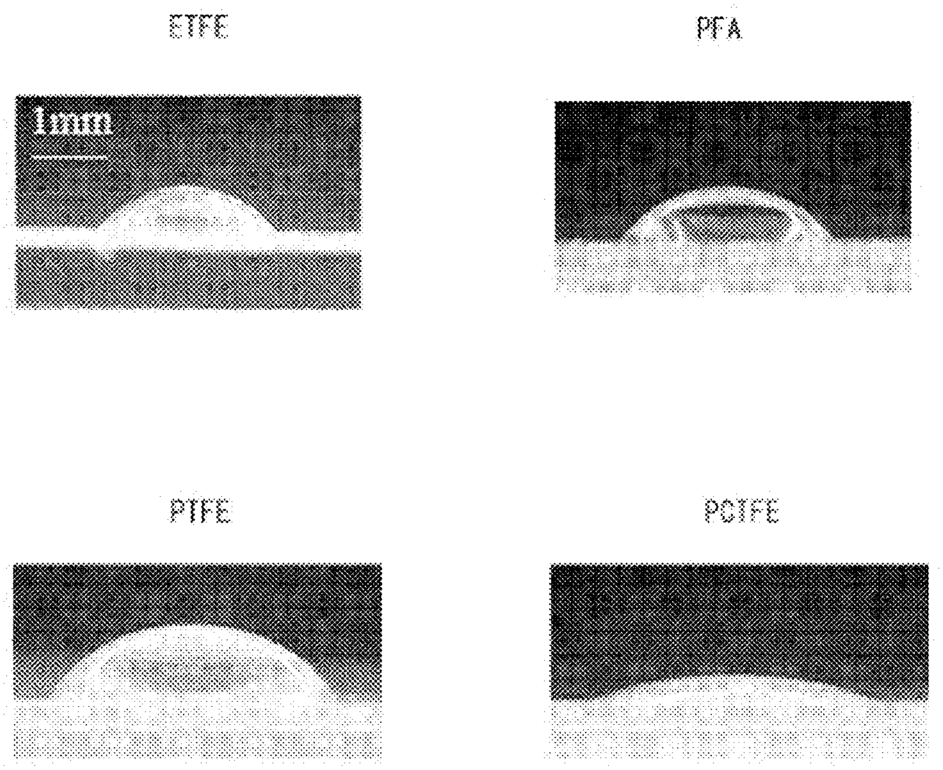
FIG. 3 is a photograph illustrating the state of a high viscosity paraffin on the surface of various fluororesins.

FIG. 3 illustrates the states of the liquid droplets of the high-viscosity paraffin on the surface of various fluororesins. In each photograph, the plate-like substance in the lower portion is the fluororesin; and thereupon, on which the liquid droplet of high-viscosity paraffin is dropped. Referring to FIG. 3, the liquid droplets of the high-viscosity paraffin are high dome-like mounds on the surface of each of ETFE, PFA, and PTFE; with a large contact angle. In other words, the wettability between these fluororesins and the high-viscosity paraffin was low.

On the contrary, on the surface of PCTFE, the liquid droplets were obviously spread in flat shapes flatter than the examples of other three fluororesins; with a smaller contact angle. In other words, PCTFE exerted a high wettability to the high-viscosity paraffin. All of ETFE, PFA, and PTFE include tetrafluoroethylene in their structural unit; while PCTFE is a trifluoroethylene resin that does not include tetrafluoroethylene in its structural unit and include trifluoroethylene in the structural unit instead. From the test result illustrated in FIG. 3, it was verified that the trifluoroethylene resin had a wettability to the high-viscosity paraffin higher than the resin including tetrafluoroethylene in the structural unit.

Figure 4:
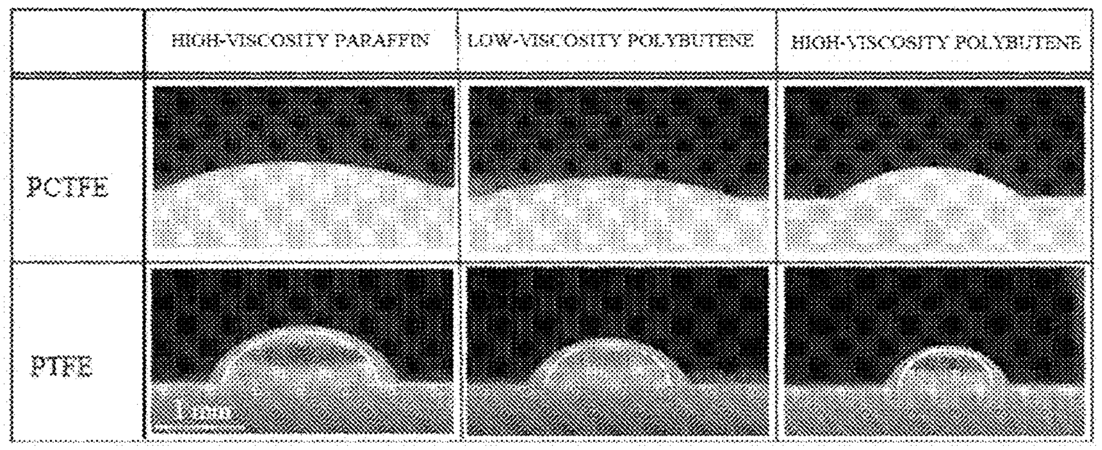
FIG. 4 is a photograph illustrating the state of various hydrocarbon oils on the surface of polychlortrifluoroethylene (PCTFE) and PTFE.

Further, FIG. 4 illustrates the states of the liquid droplets of various hydrocarbon oils on the surface of PCTFE and PTFE. The photographs illustrate the examples in which the hydrocarbon oil was high-viscosity paraffin, low-viscosity paraffin, and high-viscosity polybutene, respectively from the left of the chart; the upper row corresponding to the example in which PCTFE was used as the fluororesin, and the lower row corresponding to the example in which PTFE was used as the fluororesin. Referring to FIG. 4, the liquid droplet took the shape of a high mound on the surface of PCTFE for any of the three hydrocarbon oils with a large contact angle; while on the surface of PCFE, the liquid droplet was spread in a flat shape, with a small contact angle. In other words, PCTFE exerted a remarkably high wettability higher for PCTFE than PTFE for any of the hydrocarbon oils. From this result, it was considered that the wettability to various hydrocarbon oils was higher for PCTFE, a trifluoroethylene resin, than for PTFE, a tetrafluoroethylene resin.

It is found from the above results that PCTFE, which is a trifluoroethylene resin, exhibits a high wettability to hydrocarbon oils. From this result, the dispersibility must be high if a trifluoroethylene resin is made into grains and mixed with a hydrocarbon oil.

[2] Improvement of Friction Characteristics Using the Lubricant

Next, resin particles containing the trifluoroethylene resin found in the above Test [1] to have a high wettability to hydrocarbon oils were used in combination with hydrocarbon oils to prepare a lubricant, and the influence on the friction characteristics of the electric contact was examined. In addition, the relationship between the density of the resin particles on the surface of the electric contact and the friction characteristics was also examined.

[Test Method]

(Preparation of the Sample)

(1) Preparation of the Lubricant

Coarse PCTFE powder (PCTFE M-300H, a product of Daikin Industries, Ltd. was crushed with a jet mill to prepare resin particles with the center grain size of 5 μm. The center grain size was assessed by the laser diffraction/scattering method. The resin particles were dispersed in acetone (containing water) as the solvent, then tetradecane (viscosity: 2.7 $mm^2/s$ @ 37.8° C.) was added as the base oil, then the mixture was stirred. The obtained composition was used as the lubricant 1. In the lubricant 1, the ratio of mixture for the resin particles and the base oil was changed for variation of the content of the resin particles from 0% by mass (no resin particles added) to 50% by mass in relation to the mass of the base oil. The mixture ratio between the base oil and the solvent was adjusted in accordance with the thickness of the lubricant film to be formed.

(2) Preparation of the Electric Contact Sample

As a sample simulating the electric contact, a pair of a flat-plate sample and an embossed sample was prepared. First, a 3 μm-thick Ag film was formed on the surface of a clean copper alloy plate. Using this Ag-plated copper alloy plate, a flat-plate sample was formed; in addition, a hemisphere emboss with the radius of curvature of 3 mm was formed by press molding to prepare an embossed sample. Both samples were degreased by organic washing and dried.

The flat-plate sample was immersed in the lubricant 1, then the acetone solvent was volatilized to form a film of the lubricant. The base oil was diluted with acetone at the same concentration as that for the lubricant 1, and an Ag-plated copper alloy plate was immersed in the resulting solution to form a film with the thickness ranging from 1 to 2 μm; it was considered that the film of the lubricant 1 has substantially the same thickness. The density of the resin particles on the surface of the sample was adjusted by choosing the concentration of the resin particles in the lubricant used (0 to 50% by mass in relation to the mass of the base oil) and the concentration after dilution with the solvent to obtain a desired value for the element ratio [F]/[M] obtained by EDS measurement described below. No film was formed on the surface of the embossed sample.

(3) Preparation of the Terminal Sample

The engaging male connector terminal with a 0.64 mm-wide tab composed of an Ag-plated copper alloy material was immersed in the lubricant 1, and the solvent was removed by volatilization to form a film of the lubricant 1. For the lubricant 1, a lubricant containing resin particles by 50% by mass in relation to the mass of the base oil was used. For the counterpart connector terminal to be engaged with the male connector terminal, a female connector terminal including an Ag-plated copper alloy material was used, similar to the male connector terminal prepared in the above manner. No coating of the lubricant was formed on the female connector terminal.

(Assessment Method)

(1) Assessment of the Density of the Resin Particles

To assess the density of the resin particles on the surface of the sample on which the film of the lubricant was formed, the value for the element ratio[F]/[M] was estimated based on the result of the EDS measurement. First, after the solvent was sufficiently removed by volatilization, EDS measurement was carried out for the flat-plate sample on which the film of the lubricant 1 was formed, using a scanning electron microscope (SEM) device. The measurement conditions were as follows.

Angle of incidence: Vertical incidence
Acceleration voltage: 15 kV
Working distance (WD): 10 mm
Intensity of the x-rays: approx. 10-100 cps The abundance of F and Ag was estimated from the EDS test result. Specifically, the number of F atoms [F] was divided by the number of Ag atoms [Ag] to calculate the element ratio [F]/[M]. The density of the resin particles dispersed o the surface of the flat-plate sample is higher for higher values for the element ratio [F]/[M]. Note that the actual EDS measurement was carried out for the flat-plate sample after the test for measuring the friction coefficient described below at locations at which the embossed sample did not contact.

(2) Measurement of the Friction Coefficient and Assessment of the Wear

The friction coefficient was measured for each flat-plate sample. In this process, the top of the embossed sample was brought into contact with the flat-plate sample, a contact load of 4 N was applied; and in this state, the sample was allowed to slide by traveling between the distance of 200 μm at the rate of 0.2 mm/sec. During the sliding, the kinetic friction force applied in the horizontal direction was measured using the load cell attached to the flat-plate sample. The (kinetic) friction coefficient was calculated by dividing the value of the measured kinetic friction force by the applied load. Variation of the friction coefficient was recorded during the sliding. The contact resistance was also measured at the same time as measuring the friction coefficient during the sliding by making a current to flow between the electric contacts.

Further, after the friction coefficient was assessed, the flat-plate sample was observed by SEM at the locations at which the sliding was carried out to assess the presence or absence of wear in the Ag-plated layer caused by the sliding.

(3) Measurement of the Terminal Insertion Force

While inserting the male connector terminal having the film of the lubricant 1 prepared in the above-described manner into the female connector terminal, the insertion force was measured using the load cell which attached to the male connector terminal. The insertion rate was 10 mm/min. For comparison, the insertion force was measured in a similar manner for an example in which no resin particles were added to the lubricant and an example in which no film of the lubricant was formed. Moreover, power was supplied to the connector terminal pair after the insertion was completed and the resistance between the terminals was measured.

[Test Result]

(1) Friction Coefficient and Wear on the Surface

Figure 5:
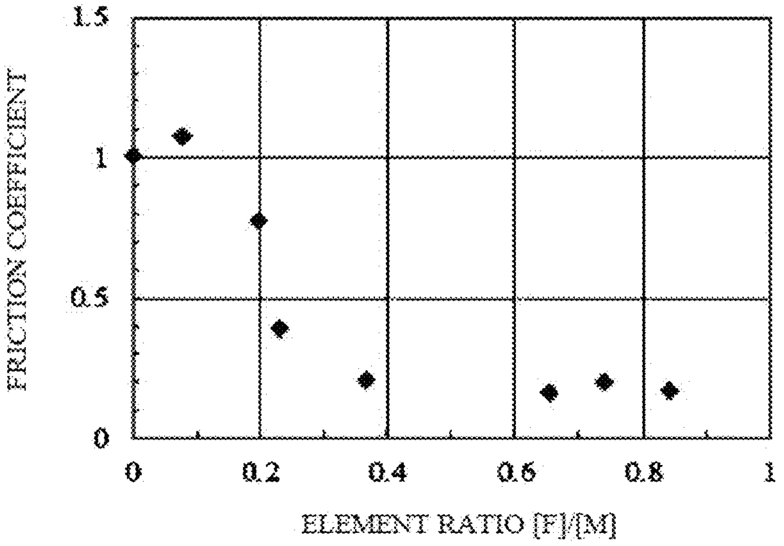
FIG. 5 is a view illustrating variation of the friction coefficient in an element ratio [F]/[M] for an example in which a coating of a lubricant 1 is formed on the surface of an Ag cover layer.

FIG. 5 illustrates the relationship between the element ratio [F]/[M] obtained by the EDS measurement and the friction coefficient. The graph illustrates the element ratio [F]/[M] on the horizontal axis and the maximum value of the friction coefficient during sliding on the vertical axis. Referring to FIG. 5, the data point for [F]/[M]=0 corresponds to an example in which a lubricant containing no resin particle was applied. The same applies to each of the graph described below that illustrates the relationship between the element ratio [F]/[M] and the friction coefficient.

Referring to FIG. 5, the friction coefficient was decreased for the example in which the film of the lubricant 1 containing the resin particles was formed on the surface of the flat-plate sample. The friction coefficient was remarkably decreased in the regions in which the element ratio [F]/[M] was 0.2 or more. Particularly in the regions with the element ratio [F]/[M] of 0.3 or more, the friction coefficient was decreased to about 0.2. This value corresponds to about ⅕ of the friction coefficient achieved if no resin particle was added to the lubricant.

Figure 6:
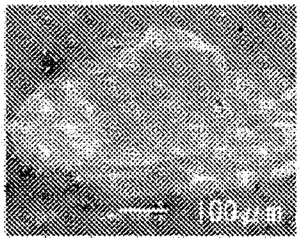
FIG. 6 illustrates scanning electron microscope (SEM) images obtained by observation at the locations of sliding for an example in which a coating of the lubricant 1 was formed on the surface of the Ag cover layer.
Figure 6:
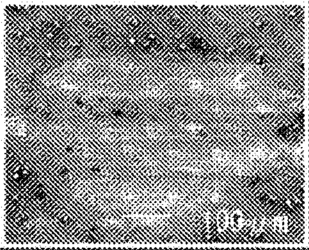
Figure 6:
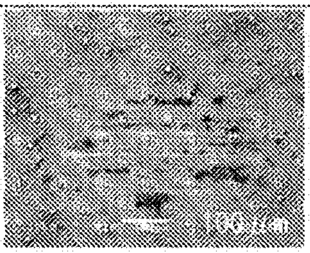
Figure 6:
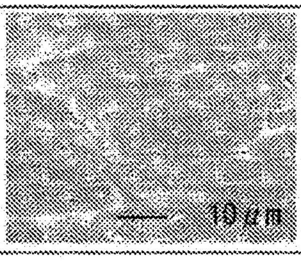
Figure 6:
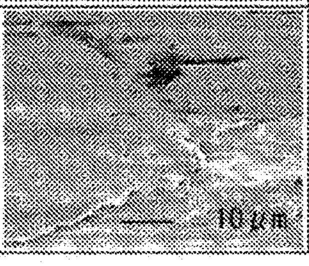
Figure 6:
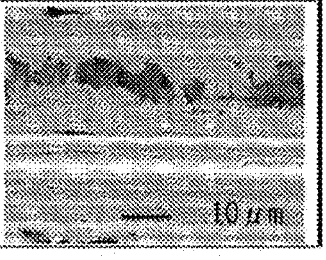

FIG. 6 illustrates SEM images obtained by SEM observation at the sliding locations on the flat-plate contact, for typical flat-plate samples among the samples for which the data points are illustrated in FIG. 5. For each such sample, FIG. 6 illustrates an image obtained at low magnification (×200 power) over the entire sliding locations and an image obtained at high magnification (×2,000 power) in the center of the sliding location as well as the values for the element ratio [F]/[M] and the friction coefficient. Each scale bar indicates the scale unit of 100 μm for the low-magnification image and 10 μm for the high-magnification image.

To begin with, referring to the leftmost observation images, the example in which the element ratio [F]/[M] was 0.13 will be described. In the low-magnification image, the bright region observed in the center represents a sliding mark. As shown in the image, a clear sliding mark was formed. Referring to the high-magnification image, a large indented structure was formed in the sliding mark, which indicates that the surface was rough. This rough surface can be considered to correspond to the surface of the Ag cover layer in which adhesion wear occurred. Note that in the low-magnification image, the dot-like structure existing as dots outside the sliding mark corresponds to the resin particles.

Referring to the observation image corresponding to the example in which the element ratio [F]/[M] was 0.23, the sliding mark was less distinct in the low-magnification image compared with the example in which the element ratio [F]/[M] was 0.13. In the high-magnification image, a smooth surface was observed especially in the upper left region, which indicates that the roughness in the surface was reduced. These results show that the adhesive wear in the Ag cover layer was reduced more for higher density of resin particles. In the high-magnification image, a region exists in the upper portion of the image with a horizontally extended shape that is observed as a remarkably dark region. The region is considered corresponding to the resin particles of which the particle form was broken as will be demonstrated in the test [5] below. The direction of sliding with the embossed sample corresponds to the horizontal direction in the image; the component of the resin particles of which the particle form was broken are considered to have been pressed to be spread by the sliding in a dragging manner, resulting in the component having been dispersed in a horizontally spread manner. As the adhesive wear in the Ag cover layer was suppressed, the friction coefficient was decreased to less than the half.

Moreover, referring to the images in the rightmost column corresponding to the example in which the element ratio [F]/[M] was 0.37, the sliding mark is as slight as substantially not distinctive from the surrounding regions in the low-magnification image. In addition, also in the high-magnification image, a smooth surface with very few indentations was observed for the entire image. These results show that with the density of the resin particles increased to as high as 0.37 of element ratio [F]/[M], the adhesive wear in the Ag cover layer was reduced to the extent at which substantially no sliding mark was formed. In addition, the dark area corresponding to the resin particles of which the particle form was broken occupies more area compared with that in the example in which the element ratio [F]/[M] was 0.23, and the darkly observed area was remarkable not only in the high-magnification image but also in the low-magnification image. As the adhesive wear in the Ag cover layer was further suppressed, the friction coefficient was further decreased to about the half.

It was found from the results of the measurement of the friction coefficient and the observation of SEM images that the friction coefficient is decreased and also wear in the surface of the sample is suppressed with resin particles having been added to the lubricant and the density of the resin particles having been increased to 0.2 or more, further to 0.3 or more by the element ratio [F]/[M] on the surface of the sample. In addition, it was found that increasing the density of the resin particles to 0.3 or more in the element ratio [F]/[M] on the surface of the sample, the friction coefficient was greatly decreased and the wear on the surface of the sample was reduced to the level at which substantially no wear occurs on the surface of the sample.

It is considered that the friction characteristics was remarkably improved because the resin particles containing a trifluoroethylene resin was used and the trifluoroethylene resin had a high wettability to the hydrocarbon oil used as the base oil as verified in the above test [1]. It is considered that with the resin particles dispersed in the base oil at a high homogeneity, the resin particles were dispersed on the surface of the sample at a high homogeneity in the example in which the film of the lubricant was formed on the surface of the sample, and the friction characteristics were improved as a result of the intense adhesion of the resin particles. It is also considered that the breaking of the particle form of the resin particles had a close relationship with the decrease of the friction coefficient and prevention of the wear. Note that the values for the contact resistance measured for the entire regions of for the element ratio [F]/[M] during the sliding were almost the same as those values in the example in which a film of the lubricant not containing a resin particle was formed. In other words, the resin particles did not interfere with the conductance of electricity between the electric contacts.

(2) Terminal Insertion Force

Figure 7:
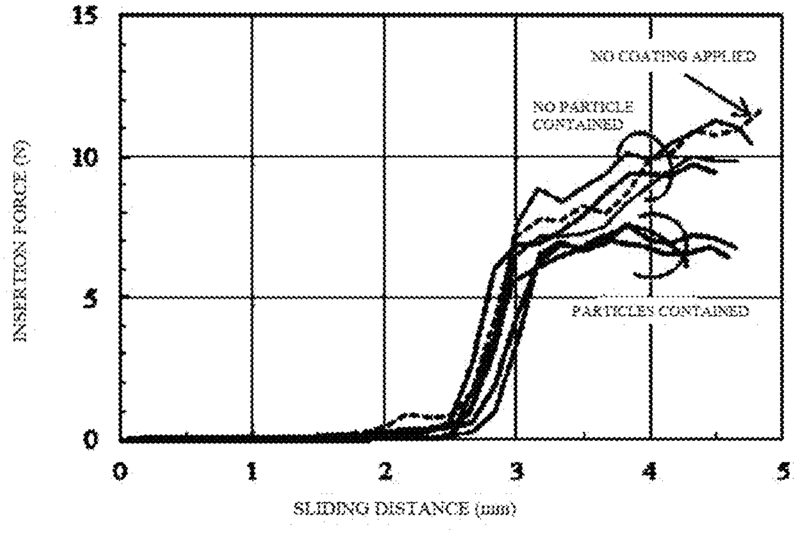
FIG. 7 is a view illustrating variation of insertion force required for engagement with a female connector terminal for an example in which a coating of the lubricant 1 is formed on a male connector terminal including an Ag cover layer.

FIG. 7 illustrates the result of measurement for the terminal insertion force. The graph illustrates the insertion distance on the horizontal axis and the insertion force measured for each insertion distance on the vertical axis. In each of the example in which the resin particles were added to the lubricant ("Particles contained") and the example in which no resin particle was added to the lubricant ("No particle contained"), the connector terminals were replaced with new ones for plurality of times of measurement, and data for each such measurement are illustrated in the drawing. The data indicated by a broken line are data for the example in which no lubricant was applied to the surface of the terminal ("No coating applied"). Note that in this test for measurement of the terminal insertion force, the film of the lubricant formed on the surface of the male connector terminal corresponds to the density of resin particles of about 0.65 in the element ratio [F]/[M].

Referring to FIG. 7 for the results, the insertion force abruptly increased for the insertion distance of about 2.5 mm for any of the examples "No coating applied", "No particle contained", and "Particles contained". This increase is considered to have occurred due to the reaction force generated when the plate spring of the female connector terminal was compressed. The abrupt increase in the insertion force converged at the insertion distance of about 3 mm; however, in the examples of "No coating applied" and "No particle contained", the insertion force gradually increased for the longer sliding distance beyond the insertion distance of about 3 mm. This increase in the insertion force was caused due to the adhesion of the Ag cover layer between the electric contacts and the increase in the friction coefficient occurred due to the adhesion. On the contrary, in the example of "Particles contained", no remarkable increase in the insertion was observed and the values for the insertion force were substantially constant after the abrupt increase in the insertion force occurred at the insertion distance of about 3 mm converged. It is considered that this result was obtained because the adhesion of the Ag cover layer between the electric contacts and the increase in the friction coefficient occurred due to the adhesion were suppressed by the addition of the resin particles to the lubricant.

The above results of measurement of the terminal insertion force correspond to the results obtained by the measurement of the friction coefficient at the electric contacts and the SEM observation on the sliding marks described above. In other words, the resin particles containing a trifluoroethylene resin was added to the lubricant, thus the adhesive wear on the surface of the Ag cover layer was suppressed at the electric contact of the connector terminal and also the friction coefficient was decreased; and as a result, the insertion force required for engaging the connector terminal was reduced. Note that the resistance between the terminals after the insertion was completed was 0.7 to 1 mΩ for all the three examples; and from this result, it was verified that coating of the lubricant and the addition of resin particles to the lubricant do not affect the conduction characteristics between the terminals.

[3] Influence from the Type of Oil

Influence of the type of the base oil composing the lubricant on the friction characteristics of the electric contacts was examined.

[Test Method]

(Preparation of the Sample)

A lubricant 2 was prepared as the lubricant containing a base oil different from that of the lubricant 1. This test was carried out in a manner similar to the test for the lubricant 1 except that the base oil was changed from tetradecane to high-viscosity paraffin (the same product as used in the test [1]) and that the solvent was changed from acetone to diisopropyl ether (containing water). Note that the solvent also was changed to secure the compatibility with the base oil.

In a manner similar to the preparation of the electric contact sample in the test [2], electric contact samples including a flat-plate sample and an embossed sample was prepared using an Ag-plated copper alloy plate. Provided, however, the lubricant 2 was used instead of the lubricant 1 to form a film of the lubricant on the surface of the flat-plate sample.

(Assessment Method)

Using the prepared electric contact samples, the friction coefficient was measured and the element ratio [F]/[M] was estimated in a manner similar to that in the above test [2].

[Test Result]

Figure 8:
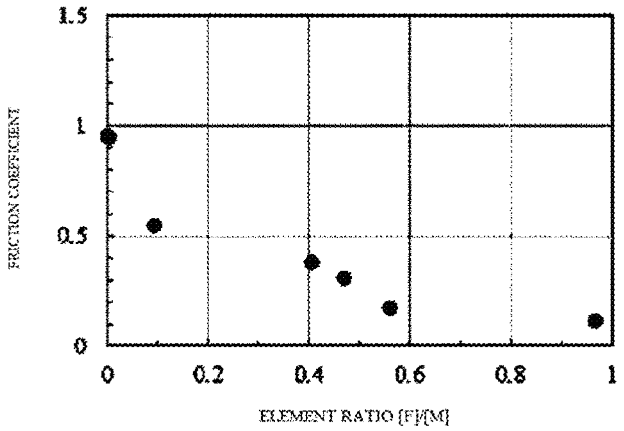
FIG. 8 is a view illustrating variation of the friction coefficient in an element ratio [F]/[M] for an example in which a coating of a lubricant 2 was formed on the surface of the Ag cover layer.

FIG. 8 illustrates the relationship between the element ratio [F]/[M] and the friction coefficient. The graph illustrates the element ratio [F]/[M] on the horizontal axis and the maximum value of the friction coefficient during sliding on the vertical axis.

Referring to FIG. 8, the friction coefficient was remarkably decreased even in the example in which the lubricant 2 was used for forming the film, similarly to the example illustrated in FIG. 5 in which the lubricant 1 was used; and the friction coefficient was remarkably decreased by the addition of the resin particles to the lubricant. However, the behavior of the friction coefficient observed as the element ratio [F]/[M] was varied was different between the lubricant 1 and the lubricant 2. Specifically, in the example using the lubricant 1, the friction coefficient was greatly decreased in the regions for which the element ratio [F]/[M] was 0.2 or more; while in the example using the lubricant 2, the friction coefficient was greatly decreased even in the region for which the element ratio [F]/[M] was as low as 0.1. In addition, in the example using the lubricant 1, the friction coefficient was further greatly decreased if the element ratio [F]/[M] was increased to 0.3 or more but the tendency of decreased friction coefficient was saturated if the element ratio [F]/[M] was further increased; while in the example using the lubricant 2, the tendency of saturation appeared only in the regions with even higher element ratio [F]/[M] of 0.6 or more.

It was found from the above results that a high effect of improving the friction characteristics was obtained by adding the resin particles containing a trifluoroethylene resin to the lubricant even if the hydrocarbon oil used as the base oil was changed. However, the behavior of the friction characteristics observed when the density of the resin particles was changed was dependent to the type of the base oil to some extent.

[4] Influence from the Type of Metal Composing the Substrate

In the test [2] and the test [3], copper alloy plate including an Ag film on the surface was used as the base oil; and the following test was carried out to examine whether the effect of improving the friction characteristics can be obtained if a metal composing the surface of the base oil other than the Ag film is used.

[Test Method]

(Preparation of the Sample)

A 1 μm-thick Ni film and a 0.4 μm-thick hard Au film including Co as an additive were formed on the surface of a clean copper alloy plate, and the resulting Au-plated copper alloy plate was used. In addition, a 0.5 Ni layer was formed on the surface of a roughened copper alloy plate; further, a Cu layer and a Sn layer were formed in this order, and the resultant was heated to form a 1.0 μm-thick layer including a Cu—Sn alloy and Sn, both of which being exposed onto the uppermost surface; and the resultant was used as a Cu—Sn-plated copper alloy plate. Also using an Au-plated copper alloy plate, a pair including a flat-plate sample and an embossed sample with the radius of curvature of 3 mm were prepared in a manner similar to that in the test [2], which was used as the electric contact sample. In a similar manner, the Cu—Sn-plated alloy plate was used to prepare a pair of a flat-plate sample and an embossed sample with the radius of curvature of 3 mm, which was used as the electric contact sample.

A film of the lubricant 1 or the lubricant 2 was formed on the surface of the prepared flat-plate sample composed of the Au-plated copper alloy plate and the surface of the prepared flat-plate sample composed of the Cu—Sn-plated copper alloy plate in a manner similar to the test [2]. No film was formed on the surface of the embossed sample regardless of the metal material used in the examples.

(Assessment Method)

The friction coefficient was measured using the prepared electric contact samples. The measurement was carried out in a manner similar to that for the test [2]. However, in this test, sliding for the sliding distance of 200 μm was carried out for 100 travels, and the friction coefficient in the center of the sliding distance was recorded for each travel. In addition, the element ratio [F]/[M] was estimated using EDS in a manner similar to the test [2]. For the sample using the Au-plated copper alloy plate, a term [Au] representing the abundance of Au was used as the abundance of metal atoms [M]; while for the sample using the Cu—Sn-plated copper alloy plate, the total of the abundance [Cu] representing the abundance of Cu and the abundance [Sn] representing the abundance of Sn ("[Cu]+[Sn]") were used as the abundance of metal atoms [M]. In addition, for the sample for which a film of the lubricant 1 was prepared using an Au-plated copper alloy plate, the surface of the flat-plate sample after 100 travels of sliding were completed was observed using SEM. EDS measurement was carried out at the same time as the SEM observation to assess the distribution of the elements on the surface.

[Test Result]

(1) Example Using the Base Oil Including an Au Cover Layer

Figure 9:
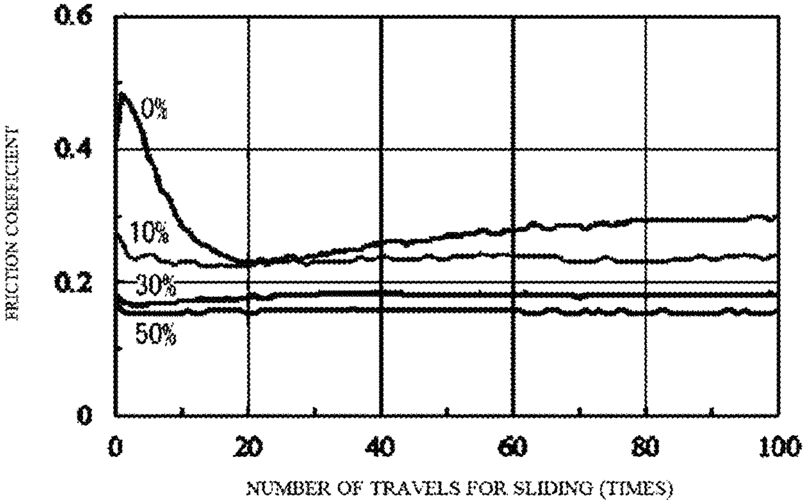
FIG. 9 is a view illustrating variation of the friction coefficient during sliding operations of 100 travels for an example in which a coating of the lubricant 1 was formed on the surface of an Au cover layer.
Figure 10:
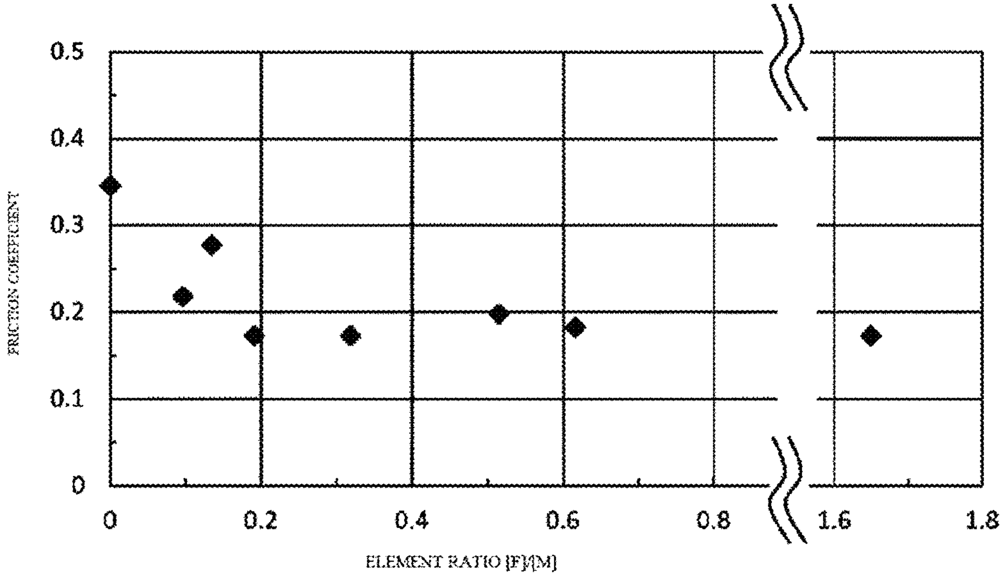
FIG. 10 is a view illustrating variation of the friction coefficient in an element ratio [F]/[M] for an example in which a coating of the lubricant 1 was formed on the surface of an Au cover layer.

FIG. 9 illustrates the result of measurement of the friction coefficient performed during the 100 travels of sliding for the example in which a film of the lubricant 1 containing tetradecane as the base oil was formed on the flat-plate sample containing an Au cover layer. The graph illustrates the number of travels for the sliding on the horizontal axis and the value of the friction coefficient obtained by each travel for sliding on the vertical axis. FIG. 9 illustrates the results of four measurements for different content of the resin particles in the prepared lubricant; and in this drawing, the content of the resin particles contained in the lubricant is represented in % by mass in relation to the mass of the base oil as the unit. Further, FIG. 10 illustrates the relationship between the element ratio [F]/[M] and the friction coefficient. The graph illustrates the element ratio [F]/[M] on the horizontal axis and the friction coefficient measured in the first travel of sliding on the vertical axis. The data illustrated in FIG. 9 and the data points illustrated in FIG. 10 have the following relationship:

0% by mass: $[F]/[M]=0$

10% by mass: $[F]/[M]=0.13$

30% by mass: $[F]/[M]=0.61$

50% by mass: $[F]/[M]=1.65$

Referring to FIG. 9, first, the friction coefficient rapidly increased at the very initial stage of the sliding cycle in the example using the lubricant containing no resin particle (0%). This increase in the friction coefficient was caused due to the adhesive wear in the Au cover layer occurred when the Au layers were brought into contact with each other and during sliding. When the Au cover layer was worn out after that, the Ni layer was exposed and sliding occurred with the Ni layers having been brought into contact with each other; and thus the friction coefficient was decreased from this timing. On the contrary, in the data for the examples using the lubricant containing the resin particles, no abrupt increase in the friction coefficient was observed in the initial stages, and the friction coefficient after the initial stages stably maintained the level lower than that in the example using the lubricant containing no resin particle. It is considered that this phenomenon was caused because the resin particles contained in the lubricant were dispersed over and adhered to the surface of the Au cover layer and the adhesive wear of Au was suppressed and also the friction coefficient was decreased. The effect of decreased friction coefficient was more remarkable in the region for which the content of the lubricant was increased exceeding 10% by mass.

In addition, it is shown also in FIG. 10 that the friction coefficient was decreased if the resin particles were added to the lubricant. The effect of decreasing the friction coefficient was remarkable if the element ratio [F]/[M] on the surface of the Au cover layer was increased to 0.1 or more. The decrease of the friction coefficient was more remarkable if the element ratio [F]/[M] was increased to 0.2 or more. Note that in correspondence with the adhesive characteristic of hard Au that is lower than the adhesive characteristic of Ag, the friction coefficient for the example using the lubricant containing no resin particle ([F]/[M]=0) was lower than the example illustrated in FIG. 5 in which the Ag cover layer was provided, and thus the level of decrease of the friction coefficient achieved by the resin particles contained in the lubricant was smaller as the ratio. However, the absolute value of the friction coefficient for the example using the lubricant containing resin particles is similar to that in the example illustrated in FIG. 5 in which the Ag cover layer was provided.

Figure 11:
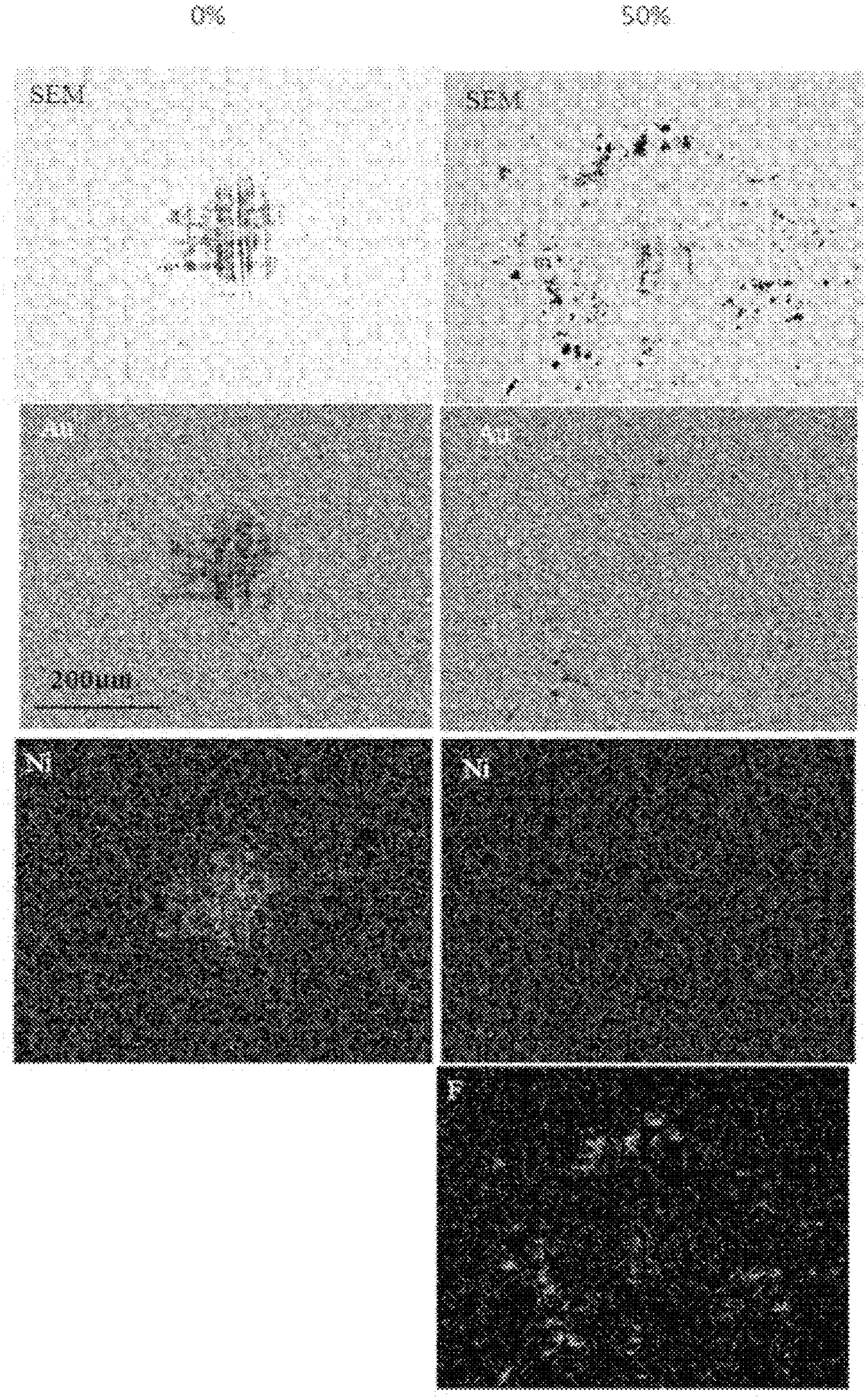
FIG. 11 illustrates SEM images and distribution images obtained by electron dispersive x-ray spectroscopy (EDS) of the state after 100 travels of sliding for an example in which a coating of the lubricant 1 was formed on the surface of an Au cover layer.

FIG. 11 illustrates SEM images obtained for the flat-plate sample after completing 100 travels of sliding and the distribution of each of the elements Au, Ni, and F obtained by EDS. Referring to FIG. 11, in the example using the lubricant containing no resin particle (0%), a region observed as a dark region was formed in the center of the SEM image. Referring to the element distribution image, the concentration of Au dropped for the region observed by SEM as the dark region while the concentration of Ni rose. It is considered that this result was obtained because the region observed by SEM as a dark region corresponded to the sliding mark, illustrating that Au was removed from the surface of the sample due to its adhesive wear and that Ni in the lower layer was exposed. This result was obtained in correspondence with the abrupt increase in the friction coefficient occurred due to the adhesion of Au and the decreased friction coefficient occurred due to the exposure of the Ni layer occurred subsequently to the increase in the friction coefficient, observed in the example in which the lubricant contains no resin particle.

On the contrary, referring to FIG. 11 for the results for the example using the lubricant containing the resin particles by 50% by mass, no region with a large area observed as a dark region in the example using the lubricant containing no resin particle was observed in the SEM image. In the EDS image, behavior of the Au concentration becoming low or Ni concentration becoming high for specific locations was not observed. Accordingly, no adhesive wear of Au occurred even after the 100 travels of sliding. This result corresponds to the result for the sliding test illustrated in FIG. 9 using the lubricant containing the resin particles, in which the low friction coefficient was stably obtained for the entire sliding cycles of 100 travels. Referring to FIG. 11, in the example using the lubricant containing the resin particles by 50% by mass, a large number of dark regions with small areas were observed in the SEM image, surrounding the center. According to the EDS result, the concentration of F was high for these regions. In other words, these regions correspond to resin particles containing a trifluoroethylene resin. Because the regions for which the concentration of F was risen to the high level were distributed in the range wider than the grain size of the resin particles (5 μm) in such a manner that these regions are extended in the horizontal direction in the image corresponding to the direction of the sliding, it is suggested that the particle form of the resin particles was broken.

It was found from the results of the measurement of the friction coefficient and the SEM/EDS measurement that the wear on the surface was suppressed and also the friction coefficient was decreased by the addition of the resin particles to the lubricant similarly to the example using the electric contact including an Ag cover layer even in the example including the film of the lubricant 1 including tetradecane as the base oil formed on the surface of the electric contact including an Au cover layer. Note that the density of the resin particles on the surface of the electric contact can be controlled by adjusting and choosing the parameters such as the content of the resin particles in relation to the base oil, the concentration after dilution with the solvent, and the thickness of the film to be formed; and it is considered from the results illustrated in FIG. 9 that if resin particles are included in the lubricant by about more than 10% by mass in relation to the mass of the base oil, the resin particles can be distributed on the surface of the electric contact at the density at which the high effects of preventing wear and decreasing the friction coefficient by using such a lubricant.

Figure 12:
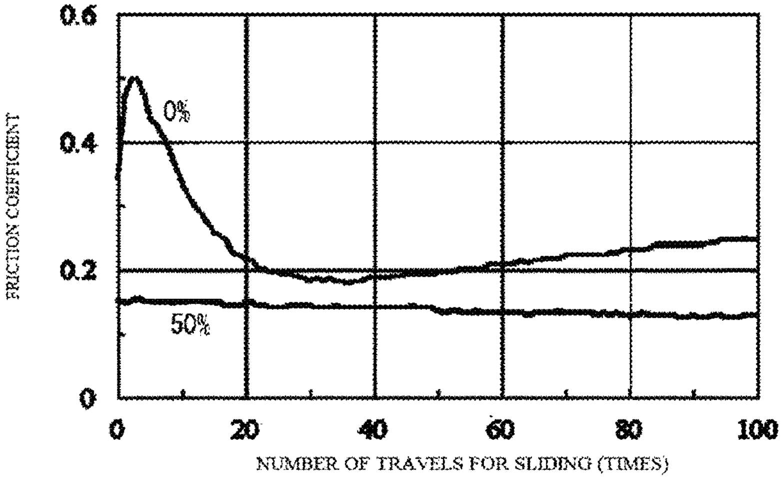
FIG. 12 is a view illustrating variation of the friction coefficient during sliding operations of 100 travels for an example in which a coating of the lubricant 2 was formed on the surface of an Au cover layer.

In addition, FIG. 12 illustrates the result of measurement of the friction coefficient performed during the sliding of 100 travels for an example in which a film of the lubricant 2 including high-viscosity paraffin as the base oil was formed on the flat-plate sample including an Au cover layer. FIG. 12 illustrates the number of travels for the sliding on the horizontal axis and the value of the friction coefficient obtained for each sliding on the vertical axis for an example using the lubricant containing no resin particle (0%) and an example using the lubricant containing resin particles by 50% by mass in relation to the mass of the base oil.

Referring to FIG. 12, similarly to the example illustrated in FIG. 9 using tetradecane as the base oil, low friction coefficients was stably obtained for the entire sliding cycles of 100 travels with the resin particles added to the lubricant. In other words, FIG. 12 suggests that the friction characteristics can be improved by adding resin particles to the lubricant even for examples using the electric contacts including an Au cover layer on their surface, regardless of the type of the base oil and similarly to the configuration including electric contacts including an Ag cover layer on their surface.

Figure 13:
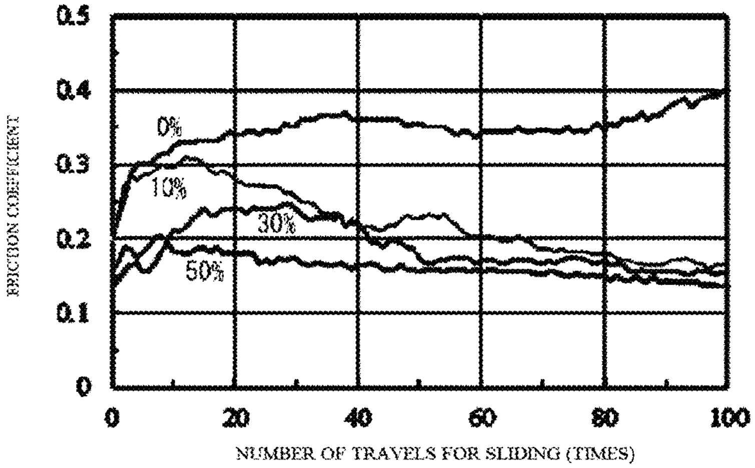
FIG. 13 is a view illustrating variation of the friction coefficient during sliding operations of 100 travels for an example in which a coating of the lubricant 1 was formed on the surface of a cover layer containing a Cu—Sn alloy.
Figure 14:
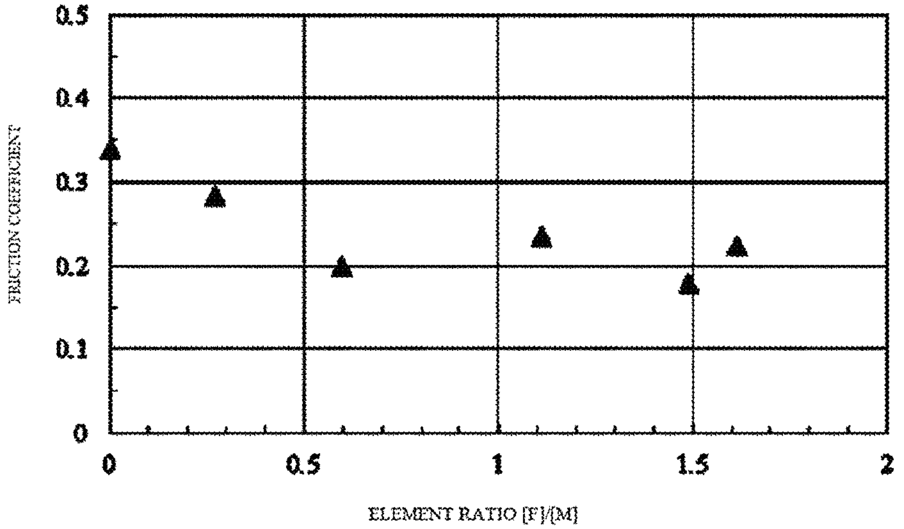
FIG. 14 is a view illustrating variation of the friction coefficient in an element ratio [F]/[M] for an example in which a coating of the lubricant 1 was formed on the surface of a cover layer containing a Cu—Sn alloy.

(2) Configuration including a substrate having a cover layer containing a Cu—Sn alloy FIG. 13 illustrates the result of measurement of the friction coefficient performed during the sliding of 100 travels for an example in which a film of the lubricant 1 containing tetradecane as the base oil on the flat-plate sample including a cover layer containing a Cu—Sn alloy. The graph illustrates the number of travels for the sliding on the horizontal axis and the value of the friction coefficient obtained during each sliding on the vertical axis. FIG. 13 illustrates the results of four measurements for different content of the resin particles in the lubricant; and in this drawing, the content of the resin particles contained in the lubricant is represented in % by mass in relation to the mass of the base oil as the unit. Moreover, FIG. 14 illustrates the relationship between the element ratio [F]/[M] and the friction coefficient. The graph illustrates the element ratio [F]/[M] on the horizontal axis and the friction coefficient measured in the first travel of sliding on the vertical axis.

Referring to FIG. 13, similar to the example using the electric contact illustrated in FIG. 9 including an Au cover layer, the friction coefficient was decreased for the entire sliding cycles of 100 travels thanks to the resin particles contained in the lubricant. The friction coefficient was further remarkably decreased for the regions for which the content of the resin particles is 10% by mass or more. Note that the friction coefficient did not increase in the very initial stages of the sliding differently from the example using the electric contact including an Au cover layer because the Cu—Sn alloy does not cause adhesive wear, a characteristic different from that of Au.

It is suggested also in FIG. 14 that the friction coefficient was decreased by adding the resin particles to the lubricant. The decrease of the friction coefficient was particularly remarkable for the regions corresponding to high element ratios [F]/[M] of 0.2 or more, more remarkable in the regions corresponding to the element ratio [F]/[M] as high as or higher than 0.5. In correspondence with the characteristic of a Cu—Sn alloy of substantially no adhesion, the level of decreased friction coefficient achieved because the resin particles were contained was low as the ratio compared with the example illustrated in FIG. 5 using the lubricant including an Ag cover layer, but the absolute value for the friction coefficient for the example using the lubricant containing the resin particles was substantially the same as that in the latter example.

Figure 15:
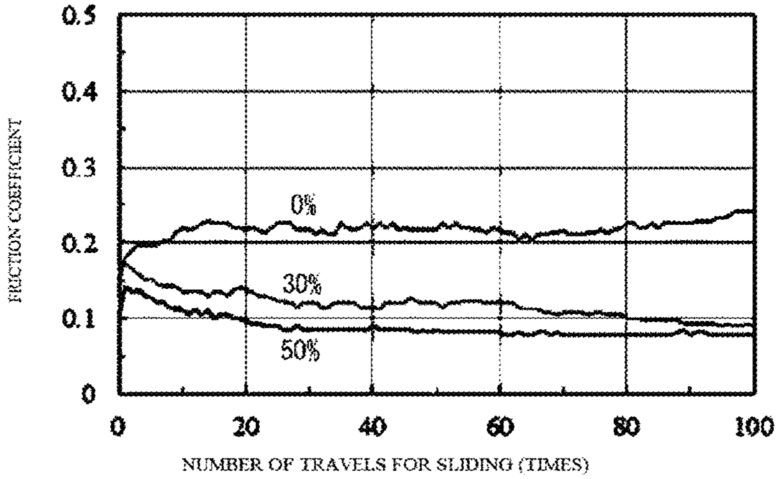
FIG. 15 is a view illustrating variation of the friction coefficient during sliding operations of 100 travels for an example in which a coating of the lubricant 2 was formed on the surface of a cover layer containing a Cu—Sn alloy.

FIG. 15 illustrates the result of measurement of the friction coefficient performed during the sliding of 100 travels for an example in which a film of the lubricant 2 containing high-viscosity paraffin as the base oil on the flat-plate sample including a cover layer containing a Cu—Sn alloy. The graph illustrates the number of travels for the sliding on the horizontal axis and the value of the friction coefficient obtained for each sliding on the vertical axis for an example using the lubricant containing no resin particle (0%) and an example using the lubricant containing resin particles by 30% by mass or 50% by mass in relation to the mass of the base oil.

Referring to FIG. 15, similar to the example illustrated in FIG. 13 using tetradecane as the base oil, the low friction coefficient was stably obtained for the entire sliding cycles of 100 travels with the resin particles added to the lubricant. In other words, FIG. 15 suggests that the friction characteristics can be improved by adding resin particles to the lubricant even for examples using the electric contacts including a cover layer containing a Cu—Sn alloy on their surface, regardless of the type of the base oil and similarly to the configuration including electric contacts including an Ag cover layer or an Au cover layer on their surface.

It was found from the above results that for all of the configurations including the base oil composing the electric contacts having a surface layer including Ag, Au, or a Cu—Sn alloy exposed on the surface layer, the friction coefficient can be decreased and the improvement of the friction characteristics can be achieved if a film of a lubricant including resin particles containing a trifluoroethylene resin in the hydrocarbon oil is formed.

[5] State of the Resin Particles after Sliding

The state of the resin particles after completion of the sliding of the electric contacts was examined. As described above, the SEM image illustrated in FIG. 6 and the SEM/EDS images illustrated in FIG. 11 suggest that the particle form of the resin particles was broken; and in the following test, further detailed examination was carried out as to whether the particle form of the resin particles was broken.

[Test Method]

(Preparation of the Sample)

In a manner similar to the test [2], an electric contact pair composed of a flat-plate sample and an embossed sample was formed by using an Ag-plated copper alloy plate, and a film of the lubricant 1 including tetradecane as the base oil was formed on the flat-plate sample. The content of the resin particles in the lubricant was set at 50% in relation to the mass of the base oil. No film was formed on the surface of the embossed sample. Note that the film of the lubricant formed on the surface of the flat-plate sample corresponds to the density of resin particles of about 0.65 in the element ratio [F]/[M].

(Assessment Method)

The surface of the flat-plate sample and the top of the embossed sample were brought into contact with each other for the sliding performed in a manner similar to the test [2] for the measurement of the friction coefficient. The number of travels for the sliding was 100.

After the sliding, the surfaces of the flat-plate sample and the embossed sample were observed by SEM. EDS measurement was carried out at the same time as the SEM observation to assess the distribution of the elements F, Cl, and Ag on the surface.

[Test Result]

Figure 16:
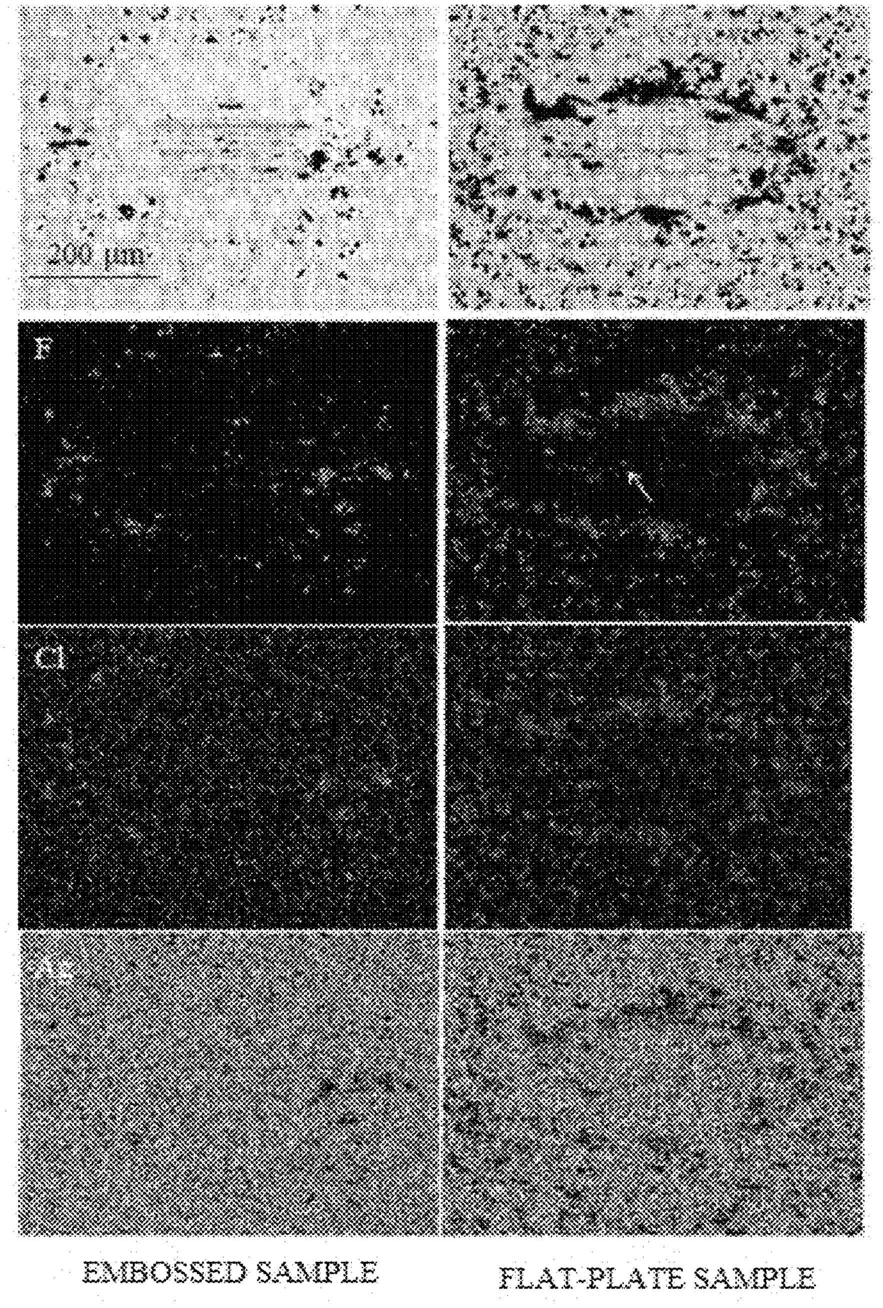
FIG. 16 illustrates SEM images and an element the distribution image by the EDS for an example in which a coating of the lubricant 1 was formed on the surface of the Ag cover layer.

FIG. 16 illustrates SEM images and element distribution images obtained by EDS. The images in the left column illustrate the result for the embossed sample while those in the right column illustrate the result for the flat-plate sample. The SEM image, distribution of F, distribution of Cl, and distribution of Ag are illustrated, in order from the upper row.

In the SEM image illustrated in FIG. 16, no sliding mark including a large indented structure was generated for the embossed sample and for the flat-plate sample. Referring to the Ag distribution image, no significant drop in the Ag concentration was not observed at the sliding locations; and it was thus verified that Ag was not worn due to adhesive wear during the sliding and no phenomenon of slide marks being formed with Ag being worn out occurred.

In the SEM image for the flat-plate sample, a large number of regions observed as regions darker than the surrounding regions exist. Also for the embossed sample, although the density is low and the area is smaller than those for the flat-plate sample, regions observed as darker than the surrounding regions exist similarly to those in the flat-plate sample. Referring to the element distribution observed by EDS, the concentration of F is high for the regions observed as dark regions. The concentration of Cl is also high for the same regions. This element distribution illustrates that the regions observed in the SEM image as dark regions appear dark due to the resin particles containing PCTFE including both F and Cl in its molecular structure.

Figure 17:
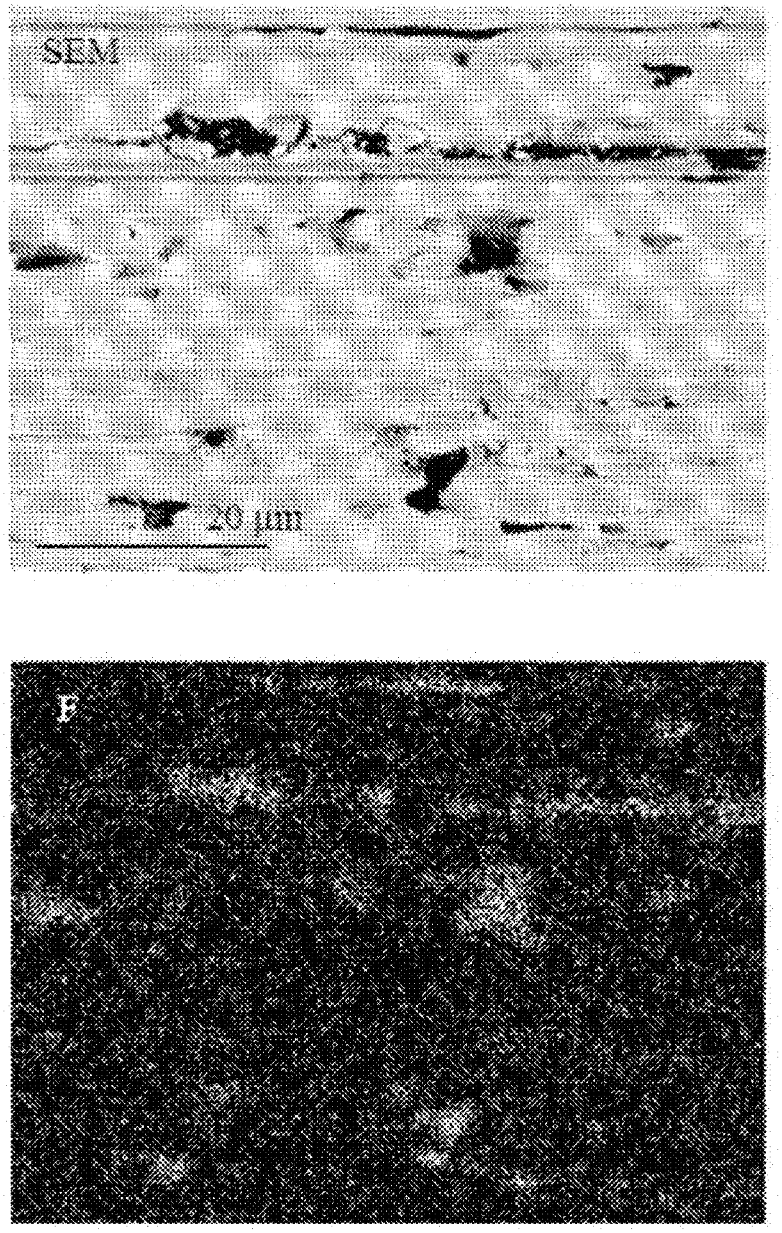
FIG. 17 illustrates distribution images of F atoms including an SEM image and an EDS image that are magnification of FIG. 16 at the location indicated by an arrow in FIG. 16.

FIG. 17 illustrates magnified images for the region pointed by the arrow in FIG. 16 in the distribution image for F in the flat-plate sample. The upper image shows the SEM image and the lower image shows the distribution image for F. Also in FIG. 17, the concentration of F is high for the regions observed as dark regions by SEM, and it is verified that the regions observed as dark regions by SEM appear dark due to the resin particles.

In the SEM image and also in the distribution image for F, the regions appearing dark due to the resin particles are spread in a range larger than 5 μm, which was the grain size of the resin particles. As is particularly remarkable in the upper part of the image, these regions are spread extending in the horizontal direction in the image, i.e., in the direction corresponding to the direction of the sliding. This result shows that the resin having been subjected to the sliding of which the particle form of the resin particles was broken and composing the resin particles was made to spread on the surface of the flat-plate sample along the direction of sliding.

Further, referring to FIG. 16, deposits originated in the resin particles were determined not only on the surface of the flat-plate sample including the film of the lubricant formed at the start of the test, but also on the surface of the embossed sample on which no film of the lubricant was formed at the start of the test and thus contained no resin particle on the surface. This result shows not only that the particle form of the resin particles was broken on the surface of the flat-plate sample but also that the resin particles of which the particle form was broken were transferred onto the surface of the embossed sample that was used as the counterpart electric contact, and that the resin particles on the surface of the embossed sample also contributed to the prevention of wear.

It is clarified from the above results that the particle form of the resin particles dispersed on the surface of the electric contact is broken and the resin particles are made to be spread in the sliding direction, and the resin particles adhere to the surface of the electric contact and adhere to the surface of the counterpart electric contact in this state. It is considered that the particle form of the resin particles is broken and thus the resin particles are made to intensely adhere to the surface of the electric contacts; and that thus the effects of the decrease of the friction coefficient and prevention of wear exerted by the resin particles are maintained even after the sliding is completed.

An embodiment of the present disclosure is as described above, however, the present invention is not limited to the embodiments described above, and can be implemented by various modifications or alterations within the scope not deviating from the gist of the present invention. The present application claims priority to Japanese Patent Application No. 2019-065499 filed on Mar. 29, 2019, which is incorporated herein by reference in its entirety.

LIST OF REFERENCE NUMERALS

1 (Flat-plate) electric contact
11 Substrate
12 Substrate material
13 Cover layer
14 Lubricant layer
2 Embossed electric contact (counterpart electric contact)
21 Emboss
3 Male connector terminal
31 Tab
32 Barrel portion
5 Wire harness
51 Main harness portion
52 Branch harness portion
53 Connector
54 Adhesive tape

What is claimed is:

1. A lubricant comprising:
a base oil; and
resin particles containing a trifluoroethylene resin,
wherein the content of the resin particles is 10% by mass or more in relation to a mass of the base oil, and
wherein the base oil includes no fluorine oil.

2. The lubricant according to claim 1, wherein the content of the resin particle is 30% by mass or more in relation to the mass of the base oil.

3. The lubricant according to claim 1, further comprising a volatile solvent.

4. The lubricant according to claim 3, wherein the volatile solvent includes water.

5. The lubricant according to claim 1, wherein the base oil includes a hydrocarbon oil.

6. The lubricant according to claim 1, wherein the base oil is a hydrocarbon oil.

7. The lubricant according to claim 1, wherein the trifluoroethylene resin is polychlorotrifluoroethylene.

8. The lubricant according to claim 1, wherein a mean grain size of the resin particles is 1 μm or more and 50 μm or less.

9. The lubricant according to claim 1, wherein the content of the resin particles is 100% by mass or less in relation to the mass of the base oil.

10. An electric contact comprising a metal material as a substrate configured to electrically contact another conductive member, the electric contact comprising a layer of the lubricant according to claim 1 on a surface of the substrate.

11. The electric contact according to claim 10, wherein the abundance of elements determined by a method in which an electron beam is incident normally to the surface of the electric contact at an acceleration voltage of 15 kV and characteristic x-rays generated thereby is analyzed be expressed by the following Formula in the unit of in an atomic % (at %):

$$[F]/[M] \geq 0.2$$

where [F] denotes abundance of F atoms; and [M] denotes abundance of the metal atom composing the substrate.

12. The electric contact according to claim 10, wherein the substrate includes at least one selected from the group consisting of: Ag, Au, and a Cu—Sn alloy, in a form in which the same are exposed on a surface.

13. The electric contact according to claim 10, wherein the abundance of elements determined by a method in which an electron beam is incident normally to the surface of the electric contact at an acceleration voltage of 15 kV and characteristic x-rays generated thereby is analyzed be expressed by the following Formula in the unit of at %:

$$[F]/[M] \leq 2.0$$

where [F] denotes the abundance of F atoms; and [M] denotes the abundance of the metal atom composing the substrate.

14. A connector terminal comprising the electric contact according to claim 10 arranged at a location of electric contact with a counterpart connector terminal.

15. The connector terminal according to claim 14, wherein the connector terminal is a male connector terminal or a female connector terminal engaged and connected to the counterpart connector terminal.

16. The connector terminal according to claim 14, wherein the particle form of the resin particles is broken when the electric contact is brought into contact with a surface of the counterpart connector terminal for sliding.

17. A wire harness comprising the connector terminal according to claim 14.

* * * * *